(12) United States Patent
Papadimitratos et al.

(10) Patent No.: US 8,159,391 B2
(45) Date of Patent: Apr. 17, 2012

(54) METHOD TO SECURE GNSS BASED LOCATIONS IN A DEVICE HAVING GNSS RECEIVER

(75) Inventors: Panagiotis Papadimitratos, Lausanne (CH); Aleksandar Jovanovic, Lausanne (CH)

(73) Assignee: Ecole Polytechnique Federale de Lausanne (EPFL), Ecublens (CH)

(*) Notice: Subject to any disclaimer, the term of this patent is extended or adjusted under 35 U.S.C. 154(b) by 238 days.

(21) Appl. No.: 12/618,465

(22) Filed: Nov. 13, 2009

(65) Prior Publication Data
US 2010/0117899 A1    May 13, 2010

Related U.S. Application Data

(60) Provisional application No. 61/193,277, filed on Nov. 13, 2008.

(51) Int. Cl.
*G01S 19/21* (2010.01)
(52) U.S. Cl. ................................. 342/357.59
(58) Field of Classification Search ............ 342/357.59, 342/357.58, 357.45
See application file for complete search history.

(56) References Cited

U.S. PATENT DOCUMENTS

| | | | |
|---|---|---|---|
| 4,983,980 A | | 1/1991 | Ando |
| 5,036,329 A | | 7/1991 | Ando |
| 5,808,581 A | * | 9/1998 | Braisted et al. .......... 342/357.58 |

OTHER PUBLICATIONS

Panagiotis Papdimitratos et al., "GNSS-Based Positioning: Attacks and Countermeasures", IEEE MILCOM 2008 Nov. 17-19, 2008 (7 pages).

Walter Franz et at, "Inter-Vehicle-Communications Based on Ad Hoc Networking Principles", The FleetNet Project, Universitatsverlag Karlsruhe 2005, pp. i-vii, and 1-287.
Elliott D. Kaplan, Understanding GPS—Principles and Applications, Artech House, 1996, pp. 1-65.
Nicolaj Bertelsen et al., "The GPS Code Software Receiver at Aalborg University", Aalborg University, 2004 (8 pages).
Markus G. Kuhn, "An Asymmetric Security Mechanism for Navigation Signals", 6th Information Hiding Workshop 2004, LNCS 3200, pp. 239-252 (2004).
Jean-Marie Zogg, "GPS Basics—Introduction to the System Application Overview", U-Blox AG, 2002, pp. 1-94.
"Vulnerability Assessment of the Transportation Infrastructure Relying on the Global Positioning System: Final Report", John A. Volpe National Transportation Systems Center, Aug. 29, 2001, pp. ii-vi, ES1-ES8, and 1-99.
Guenter W. Hein at al., "Authenticating GNSS Proofs Against Spoofs: Part 1", InsideGNSS, Jul./Aug. 2007, pp. 58-63.

(Continued)

*Primary Examiner* — Thomas Tarcza
*Assistant Examiner* — Fred H Mull
(74) *Attorney, Agent, or Firm* — DLA Piper LLP US

(57) ABSTRACT

A method to detect at a GNSS receiver whether the received GNSS signals and navigation messages are the product of an attack. If there is evidence, as provided by the method described here, that the received signals and messages originate from adversarial devices, then receiver equipped with an instantiation of the method notifies the user or the computing platform that integrates the GNSS receiver that the calculated via the GNSS functionality position and time correction are not trustworthy. In other words, our method enables any GNSS receiver, for example, GPS, GLONASS, or Galileo, or any other GNSS system, to detect if the received navigation messages are the legitimate ones (from the satellites) or not (e.g., from attacker devices that generate fake messages that overwrite the legitimate messages). Based on this detection, neither the user and nor any application running in the computing platform is misled to utilize erroneous position information.

15 Claims, 17 Drawing Sheets

OTHER PUBLICATIONS

Guenter W. Hen et al., "Authenticating GNSS Proofs Against Spoofs: Part 2", InsideGNSS, Sep./Oct. 2007, pp. 71-78.

Aron Pinker et al., "Vulnerability of the GPS Signal to Jamming", GPS Solutions, vol. 3. No. 2, pp. 19-27 (1999).

Logan Scott, "Anti-Spoofing & Authenticated Signal Architectures for Civil Navigation Systems", ION GPS/GNSS 2003, Portland, OR, Sep. 9-12, 2003, pp. 1543-1552.

Saurabh Ganeriwal et al., "Secure Time Synchronization Service for Sensor Networks", WiSE'05, Cologne, Germany, Sep. 2, 2005 (10 pages).

"Navstar Global Positioning System: Interface Specification: Navstar GPS Space Segment/Navigation User Interfaces: IS-GPS-200, Revision D", Dec. 7, 2004, pp. ii-xiv, and 1-193.

"GPS Horizontal Position Accuracy", http://users.erols.com/dlwilson/gpsacc.html, printed Jul. 8, 2010 (8 pages) (Publication Date Unknown).

"AIUB's Anonymous FTP Server", http://www.bernese.unibe.ch/download.html, Printed Jul. 8, 2010 (6 pages) (Publication Date Unknown).

Saurabh Godha, "Performance Evaluation of Low Cost MEMS-Based IMU Integrated With GPS for Land Vehicle Navigation Application: UCGE Reports No. 20239", University of Calgary: Dept. of Geomatics Engineering, Feb. 2006, pp. ii-xx, and 1-210.

Panagiotis Papadimitratos et al., "Protection and Fundamental Vulnerability of GNSS", IEEE IWSSC 2008 (5 pages).

A.D. Rabbany, "Introduction to GPS: The Global Positions System", Artech House, 2002, pp. 101-115.

A.D. Rabbany, "Introduction to GPS: The Global Positions System, Second Edition", Artech House, 2006, pp. 163-174.

Hengqing Wen et al., "Countermeasures for GPS Signal Spoofing", The University of Oklahoma, 2004 (8 pages).

Srdjan Capkun et al,. "Secure Positioning in Wireless Networks", IEEE Journal on Selected Areas in Communications, vol. 24, No. 2, pp. 221-232 (Feb. 2006).

Wener Gurtner et al., "RINEX: The Receiver independent Exchange Format, Version 3.00", Nov. 28, 2007, pp. I-II, 1-22, and A1-A15.

\* cited by examiner

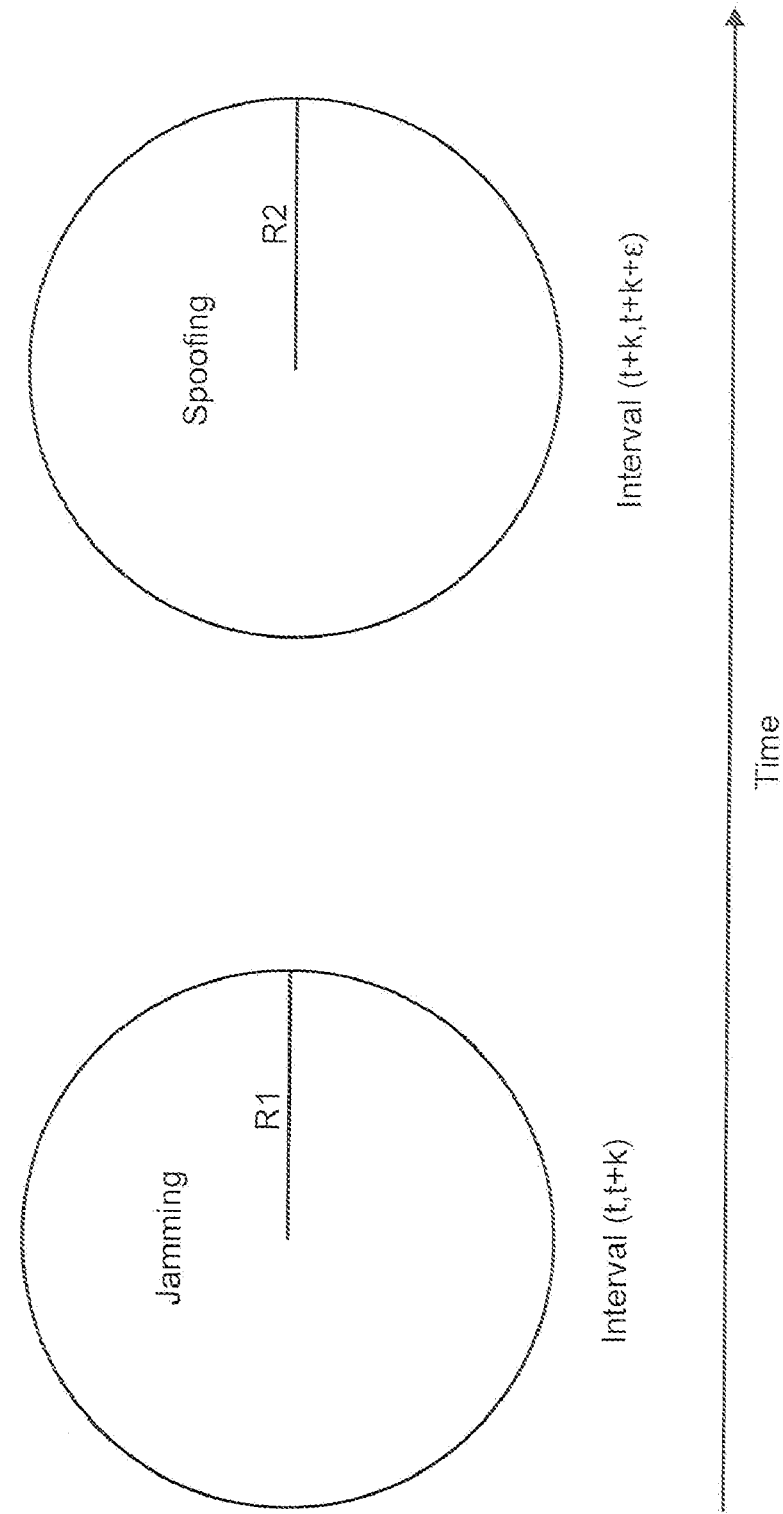

METHOD TO SECURE GNSS BASED LOCATIONS IN A DEVICE HAVING GNSS RECEIVER

RELATED APPLICATION

This application claims priority under 35 U.S.C. Section. 119 to U.S. provisional Application No. 61/193,277, entitled "Detection of Adversarial GNSS transmissions—Securing GNSS enabled positioning" filed Nov. 13, 2008, the content of which is hereby incorporated by reference herein.

INTRODUCTION

An object of the methods and devices disclosed herein is to detect at a GNSS receiver whether or not the received GNSS signals and navigation messages are the product of an attack.

As wireless communications enable an ever-broadening spectrum of mobile computing applications, location or position information becomes increasingly important for those systems. Devices need to determine their own position, to enable location-based or location-aware functionality and services. Examples of such systems include: sensors reporting environmental measurements; cellular telephones or portable digital assistants (PDAs) and computers offering users information and services related to their surroundings; mobile embedded units, such as those for Vehicular Communication (VC) systems seeking to provide transportation safety and efficiency; or, merchandise (container) and fleet (truck) management systems.

Global navigation satellite systems (GNSS), such as the Global Positioning System (GPS), its Russian counter-part (GLONASS), and the upcoming European GALILEO system, are the most widely used positioning technology. GNSS transmit signals bearing reference information from a constellation of satellites; computing platforms nodes, equipped with the appropriate receiver, can decode them and determine their own location. However, commercial instantiations of GNSS systems, which are within the scope of this paper, are open to abuse: An adversary can influence the location information, loc(V), a node V calculates, and compromise the node operation. For example, in the case of a fleet management system, an adversary can target a specific truck. First, the adversary can use a transmitter of forged GNSS signals that overwrite the legitimate GNSS signals to be received by the victim node (truck) V. This would cause a false loc(V) to be calculated and then reported to the fleet center, essentially concealing the actual location of V from the fleet management system. Once this is achieved, the physical compromise of the truck (e.g., breaking into the cargo or hijacking the vehicle), is easier, as the fleet management system would have limited or no ability to protect its assets (e.g., by notifying accordingly the law enforcement on the incident or recover the assets otherwise). This is an important problem, given the consequences such attacks can have.

Disclosed herein are methods to mitigate such vulnerability. In particular, disclosed herein are mechanisms to detect and reject forged GNSS messages, and thus avoid manipulation of GNSS-based positioning. These mechanisms are complementary to cryptographic protection, which civilian, commercial GNSS systems do not currently provide but are expected to do so in the future (e.g., authentication services by the upcoming GALILEO system). The approach disclosed herein is motivated by the fundamental vulnerability of GNSS-based positioning to replay attacks, which can be mounted even against cryptographically protected GNSS. If indeed there is evidence, as provided by the method described here, that the received signals and messages originate from adversarial devices, then a receiver equipped with an instantiation of the method notifies the user or the computing platform that integrates the GNSS receiver that the calculated via the GNSS functionality position and time correction are not trustworthy. In other words, this method enables any GNSS receiver, for example, GPS, GLONASS, or Galileo, or any other GNSS system, to detect if the received navigation messages are the legitimate ones (from the satellites) or not (e.g., from attacker devices that generate fake messages that overwrite the original, legitimate ones). Based on this detection, neither the user and nor any application running in the computing platform is misled to utilize erroneous position information (as it would be induced by the adversary).

BRIEF DESCRIPTION OF THE INVENTION

As already stated, an object of this document is to provide a method to discriminate between legitimate signals and fake signals.

Accordingly, it is proposed a method to secure GNSS based locations in a device having a GNSS receiver receiving a plurality of satellite signals, processor and a memory, said method comprising the steps of:
  acquiring first positions by the GNSS receiver,
  acquiring or extracting position relevant values of said first positions and storing them into a memory,
  setting those position-relevant values as trusted values,
  acquiring at least one second position by the GNSS receiver,
  acquiring or extracting the second position-relevant value of said second position,
  calculating an expected relevant value based on the trusted values,
  calculating a metric representing the difference between the second position relevant value and the expected relevant value,
  setting an invalid flag when the metric is above a threshold.

Basic Method Outline

The method operates in three steps:
1. Storage of at least one position that is considered trusted with the environment parameter of that position
2. Estimation (prediction, at one or more steps in the future) of system-specific parameter value(s), denoted as V, based on the GNSS specification and the measurements the receiver has collected in step 1, based on that GNSS functionality, prior to the said estimation.
3. Comparison of the (estimated) V to the obtained/measured M values that correspond to the same parameters as those for V; the M values are obtained from the GNSS PVT or navigation solution or are by-products of it. If a metric for M and V, denoted as $d_1(M, V)$ and being a function dependent on the exact format of M and V, is larger than some threshold $T_1$, then the security-enabled receiver declares the GNSS signal(s) and message(s) that resulted in the calculation of M as adversarial and notifies of the attack.

Or it operates using non-GNSS data:
3. Comparison of M values to other data available at the GNSS receiver (or the receiver bearer), denoted as B (for example, information on mobility, surroundings, communication environment), with V or its by-products (for example, calculation of velocity or acceleration from successive position samples). Note that such data, B, are not related to the prior undisrupted operation of the GNSS receiver, thus the method can work even if the receiver has no memory of prior measurements based on which it can perform the prediction of future V values. In other words, the detection can take place even if the receiver is under attack from the adversary at the very beginning of the receiver's operation. If some metric for M and B, denoted as $d_2(M,B)$ and being a function dependent on the exact format of M and B, is greater than some threshold $T_2$, then the security-enabled receiver declares the GNSS signal(s) and message(s) that resulted in the calculation of M as adversarial and notifies of the attack. Note also that data of type B can also be used as inputs, along with other inputs, for the calculation of the estimated/predicted data V mentioned above.

BRIEF DESCRIPTION OF THE FIGURES

The present invention will be better understood thanks to the attached figures, given as examples, in which:

FIG. 9: Area considered by our system model

DETAILED DESCRIPTION

Figure 1A:
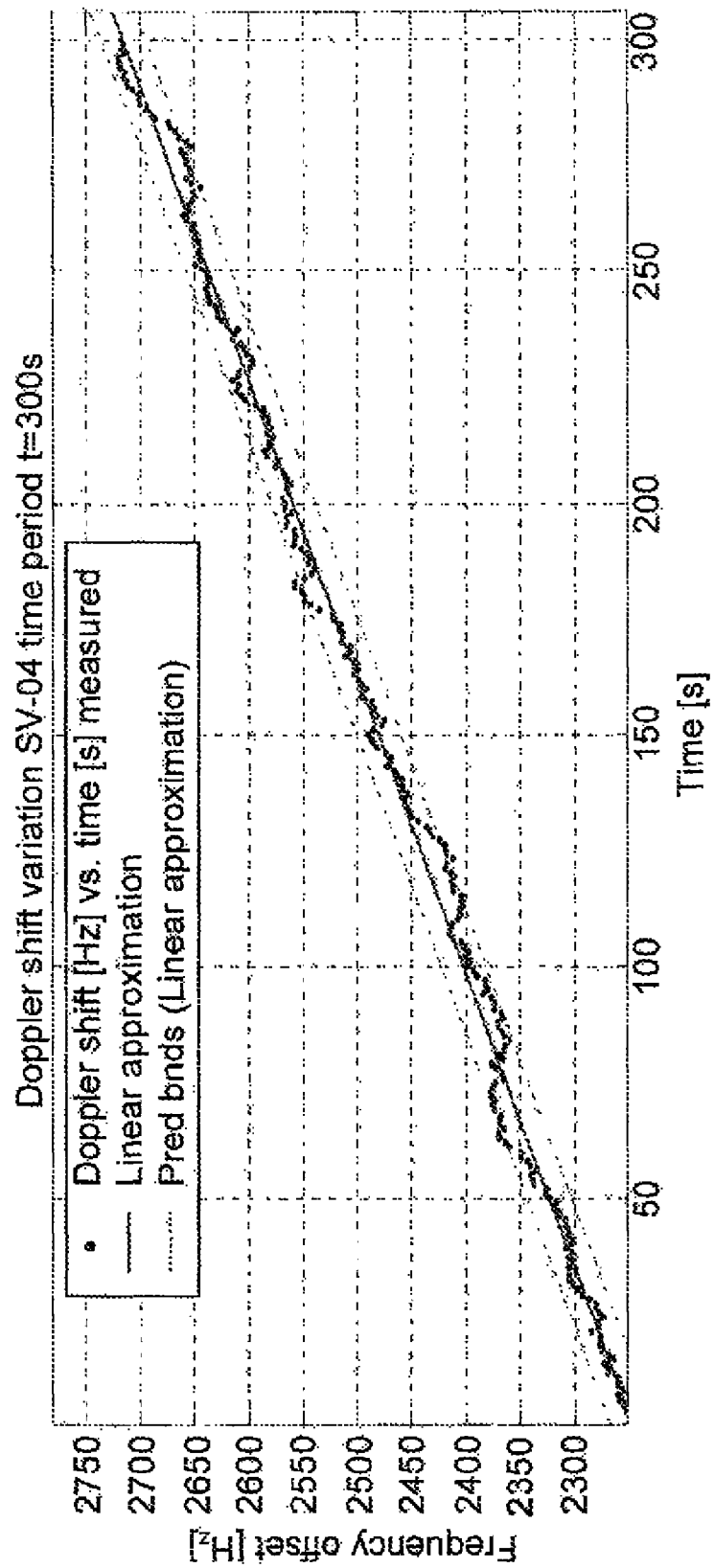
FIGS. 1A and 1B: Doppler shift data, from normal system observation (a) over a short period of time, and (b) over longer periods of time.

Method Functionality and Priority of Method Components

In general, M,V and B can be values of single parameters or they can be multi-values, that is, each of M,V, and B can be a vector, array, or set of values, and the method can operate on those vectors, arrays, or sets of values. Accordingly, the metric thresholds, $d_1$ and $d_2$, can be single or multi-values. The parameters in consideration are physical GNSS signal parameters and/or GNSS message fields, and/or any quantity that can be calculated based on those and/or any quantity that relates to these parameters can be obtained by the encompassing system or be a priori known. The following describes the basic method as well as variants of the basic method.

At a very basic level, the receiver collects data for a given parameter during periods of time it deems it is not under attack; referred to as the normal mode. Second, based on the normal mode data, the receiver predicts the value of the parameter in the future. When it suspects it is under attack, it enters what is referred to as alert mode. In this mode, the receiver compares the predicted values with the ones it obtains from the GNSS functionality. If the GNSS-obtained values differ, beyond a protocol-selectable threshold, from the predicted ones, the receiver deems it is under attack. In that case, all PVT solutions obtained in alert mode are discarded. Otherwise, the suspected PVT solutions are accepted and the receiver reverts to the normal mode.

All the methods described below can be implemented separately and independently of each other, or combined together in any manner and number or combined all, for increased security with respect to any of the individual methods. Any of the methods below, or any of their combinations, can be performed based on one or multiple points of data, M, V, and B, various single- or multi-valued thresholds, with data and thresholds being either simple or composite quantities. Any of the methods operating on such data and thresholds, or any method combining any combination of the methods described below, can be performed once or more times, with the results of detection used either individually or treated sequentially or in any other order or as inputs to any calculation, to increase the security and the trustworthiness and robustness of the adversarial disruption detection.

Doppler Shift Test

The Doppler Shift Test (DST) relies on the received GNSS signal Doppler shift, with respect to the nominal transmitter frequency ($f_t$=1.575 GHz). The Doppler shift is produced due to the relative motion of the satellite with respect to the receiver. The satellite velocity is computed using ephemeris information and an orbital model available at the receiver. The received frequency, $f_r$, increases as the satellite approaches and decreases as it recedes from the receiver. The measured values, M, for Doppler shift are obtained by the GNSS receiver for each received signal and thus for each navigation message. The estimated/predicted values, V, can be calculated easily, for example, by the Doppler equation and the prior knowledge (measurements) of the GNSS receiver. Then, if M differs from V more than a threshold $T_1$ (for example, few tenths of Hz per second), then the signal and the navigation messages are deemed to originate from an adversary.

The value of the DST is that the Doppler shift of the GNSS signals when received changes smoothly over time, independently of many factors, thus making the comparison of M and V reliable. Note also that it is possible, as explained later in this document, to have DST based on externally available data B.

Once lock to GNSS signals is obtained again, predicted Doppler shift values are compared to the ones calculated due to the received GNSS signal. If the latter are different than the predicted ones beyond a threshold, the GNSS signal is deemed adversarial and rejected. What makes this approach attractive is the smooth changes of Doppler shift and the ability to predict it with low, essentially constant errors over long periods of time. The Doppler shift is produced due to the relative motion of the satellite with respect to the receiver. The satellite velocity is computed using ephemeris information and an orbital model available at the receiver. The received frequency, fr, increases as the satellite approaches and decreases as it recedes from the receiver; it can be approximated by the classical Doppler equation:

$$f_r = f_t \cdot \left(1 - \frac{v_r \cdot a}{c}\right) \quad (1)$$

where $f_t$ is nominal (transmitted) frequency, $f_r$ received frequency, $v_r$ is the satellite-to-user relative velocity vector and c speed of radio signal propagation. The product $v_r \cdot a$ represents the radial component of the relative velocity vector along the line-of-sight to the satellite. If the frequency shift differs from the predicted shift for each visible satellite in the area depending on the data obtained from the almanac (in the case when the navigation history is available), for more than defined thresholds (Δfmin, Δfmax) or estimated Doppler shift from navigation history differs for more than the estimated shift, knowing the rate (r), the receiver can deem the received signal as product of attack. The Almanac contains approximate position of the satellites, time and the week number (WN, t), and the corrections, such that the receiver is aware of the expected satellites, their position, and the Doppler offset.

Because of the high carrier frequencies and large satellite velocities, large Doppler shifts are produced (±5 kHz), and vary rapidly (1 Hz/s). The oscillator of the receiver has frequency shift of ±3 KHz, thus the resultant frequency shift goes therefore up to ±9 KHz. Without the knowledge of the shift, the receiver has to perform a search in this range of frequencies in order to acquire the signal. The rate of Doppler shift receiving frequency caused by the relative movement between GPS satellite and vehicles approximately 40 Hz per minute to the maximum. These variations are linear for every satellite. If the receiver is mobile, the Doppler shift variation can be estimated knowing the velocity of the receiver.

Figure 1B:
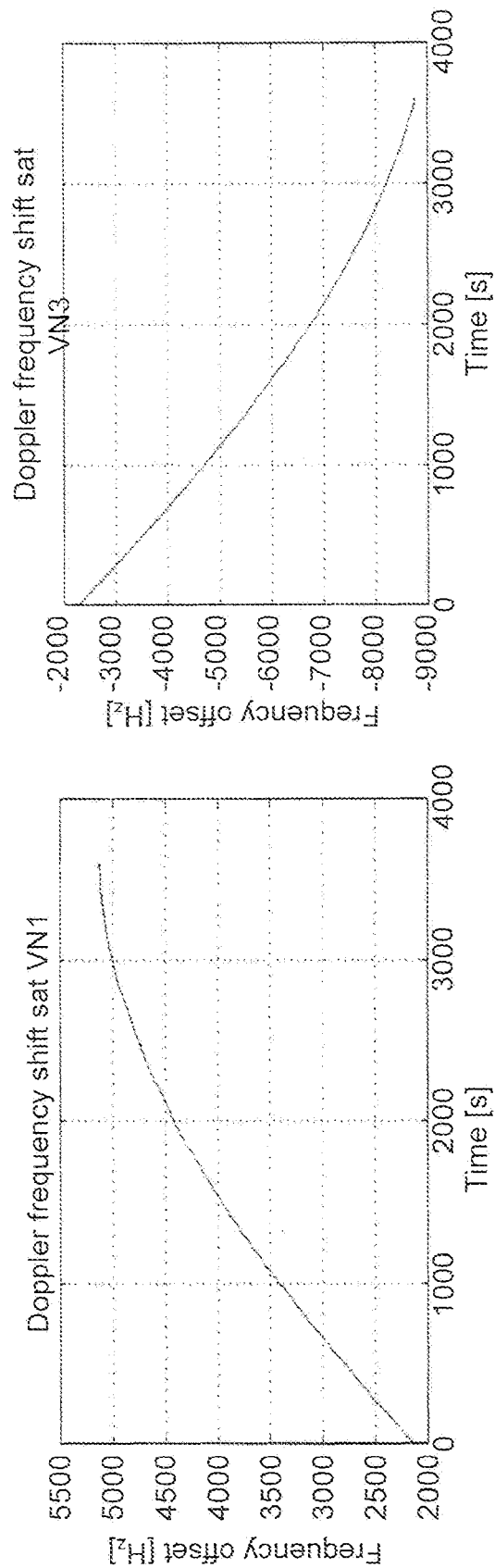

We observe in FIG. 1 the Doppler shift variation based on data collected by an SHTECH receiver: the maximum change in rate is within +/−20 Hz around a linear curve fitted to the data. This clues that with sufficient samples, the future Doppler Shift rate, and thus the shift per se, values can be predicted. In practice, 50 sec of samples, with one sample per second, appear to be sufficient. More precisely, the rate of change of the frequency shift, Di(t), is computed for each satellite as:

$$r_i = \frac{dD_i(t)}{dt} \quad (2)$$

which can be approximated by numerical methods. Based on prior samples for each Di, available for some time window the frequency shift can be predicted based those samples and the estimate rate of change of the Doppler shift. Based on prior measured statistics of the signal at the receiver, the variance $\sigma^2$ of a random component, assumed to be $N(0, \sigma^2)$, can be estimated. This random component is due to signal variation (including receiver mobility, RF multipath, scattering). Its estimation can serve to determine an acceptable interval around the predicted values.

The adversary is mostly at the ground and static or moving with speed that is much smaller than the satellite velocity, which is in a range around 3 km/s. Thus, the adversary will not be able to produce the same Doppler shift as the satellites, unless it changes its transmission frequency to match the one receivers would obtain from GNSS signals due to the Doppler shift. An unsophisticated attacker would then be easily detected. But even a sophisticated attack can be detected, exactly because it is hard to perform the attack: the attacker needs to predict the shift and change its transmission frequency so that the receiver accepts the false signals and computes the PVT solution. The attacker would need to be able to do that in real-time—but since the change is just few Hz/s, it would be very hard for an attacker to perform this change in real-time. The only option would be to have multiple transceivers and transmit signals to a targeted user for which it would still have some uncertainty on the wireless medium and mobility.

Figure 2:
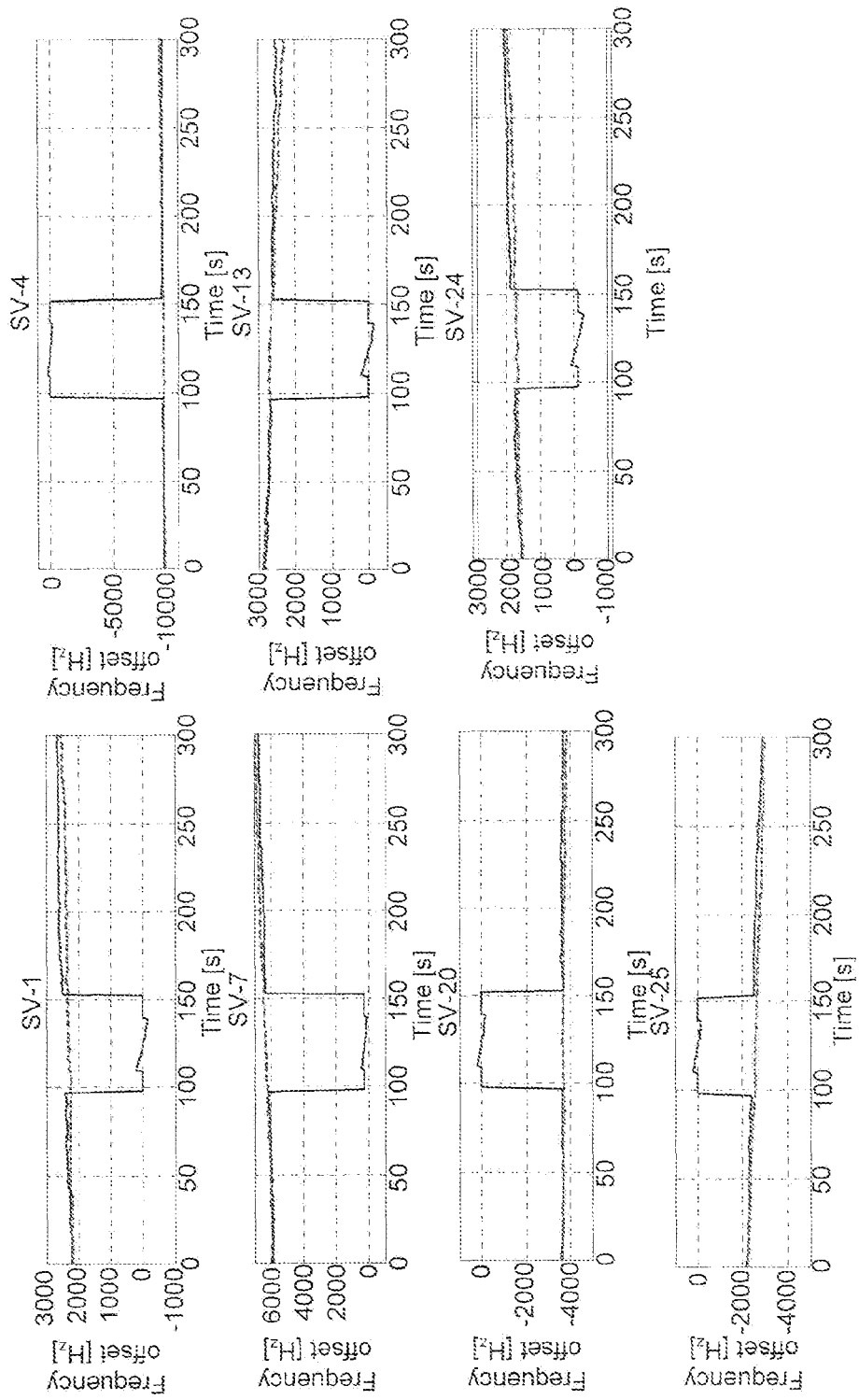
FIG. 2: Doppler Shift Test Evaluation. (a) Doppler shift attack; unsophisticated adversary. The dotted line represents the predicted and the solid line the measured frequency offset. Striking difference between measured and expected Doppler Shift (DS).

The easy detection of an relatively non-sophisticated adversary is illustrated in FIG. 2: After a "gap" corresponding to jamming, there is a striking difference, between 100 and 150 seconds, when comparing the Doppler shift due to the attack to the predicted one.

Figure 3:
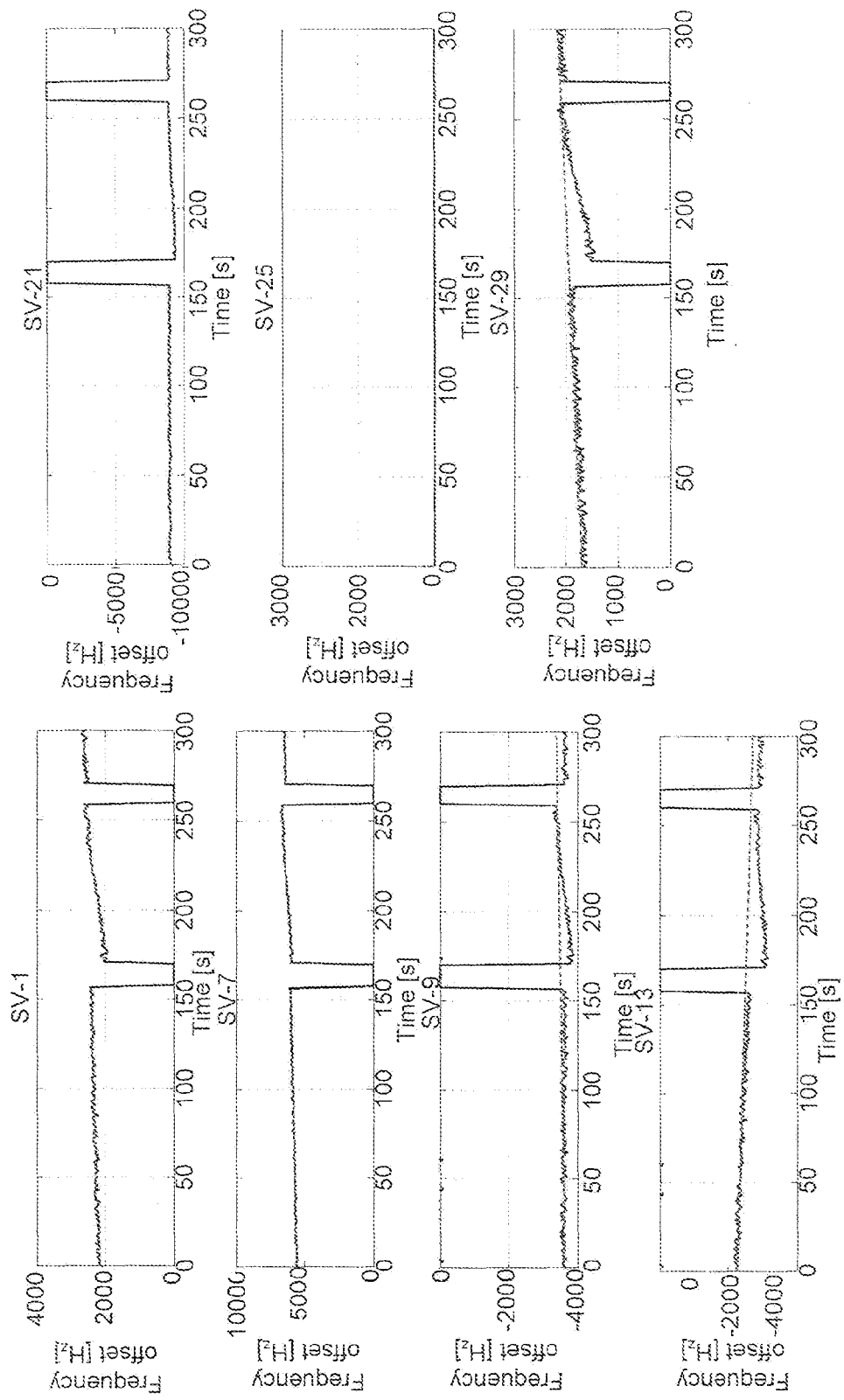
FIG. 3: Doppler shift attack; sophisticated adversary. The dotted line represents the predicted and the solid line the measured frequency offset. In spite of the targeted attack, there is always some uncertainty about the receiver's mobility; thus easily detectable DS differences ~300 Hz

The case of a sophisticated adversary that controls its transmission frequency (the attack starts at 160s) is shown in the FIG. 3. The adversary has multiple adaptive radios and it operates according to the following principle: it predicts the Doppler frequency shift at the location of the receiver, and it then changes its transmission frequency accordingly. If the attacker is not precisely aware of the actual location and motion dynamics of the victim node (receiver), there is still a significant difference between the predicted and the adversary caused Doppler shift. This is shown, with a magnitude of approximately 300 Hz, in FIG. 3; a difference that allows detection of the attack.

Power Test

The Power Test (PT) consists of a comparison of the received signal power level with nominal expected or predicted received power values for GNSS signals. The satellite nominal transmitted power varies in the range (650, 750) W, and it significantly attenuated when it arrives at the earth surface after propagating across more than approximately 20000 km. GNSS receivers keep track of statistics of the received power. PT utilizes known and expected values of those statistics, as data B, and compares for any reception and thus the obtained M to the B data. As a result, the receiver and the method can immediately yield detection or no-detection output, the latter if M is within the B values/range plus some threshold $T_2$. For example, if the received power exceeds the some expected signal strength by some deviation of a few, e.g., 3 dB, then it is deemed that the signal originates from an adversary.

PT consists of a comparison of the signal power level after de-spreading of the navigation signal. The satellite nominal transmitted power varies in the range (450, 550) W and has very low level at the Earth surface after propagating more than 20000 km. At the Earth surface, power level is well below the noise level. By precisely measuring received signal power levels after signal despreading, and keeping tracks of the average power level and its deviation, receivers can obtain information about signal strength statistics and then make decision about further processing of received signal based on the statistics of the signal detected previously.

This countermeasure is based on the idea that relatively unsophisticated GPS spoofing attacks will tend to use GPS satellite simulators. Such simulators will typically provide signal strengths many orders of magnitude larger than any possible satellite signal at the Earth's surface. This would be an unambiguous indication of a spoofing attack. Performing power test in detecting attacks is probably the best way to detect and avoid an attack. The power level of the ground signal is propagating and changing fast so these variations have different statistics comparing to the satellite signals, with relatively constant level, and therefore attacks are targeted to individual receiver.

Here is considered several scenarios, an attacker that is controlling the whole area, and that there are attacker-free areas. Consider the case of a mobile receiver, for example, mounted on a vehicle that is passing through. The vehicle trajectory can either go through or avoid the attacker zone. The situation when an attacker is controlling an area, transmitting satellite signals with the power equal for all satellites and ranges few watts, with this small power transmitters attacker can control an area of few kilometers. This was the assumption when choosing the parameters for the simulations. Attackers controlling an area with different diameters (powers) were chosen. The issue here is antenna gain that varies with the angle of the received waves. Averaged values for antenna gain for standard ASHTECH Z-II receivers were used.

For consideration of the free-space propagation model, a shadowing model for the urban area, which includes random component X, which models the shadowing and scattering of the radio waves, with zero mean and variance δ=3 (parameter used for the urban regions), log-normally distributed was used. Summing all, the power at the reception could be computed according to the well-known formula:

$$P_r = 10 \lg \frac{P_t G_t G_r \lambda^2}{(4\pi)^2 d^2 L} + X(0, 3 \text{ dB}, n) \quad (3)$$

where the data and the parameters that were used in the computations are given in Table I (below).

For the PT, a sliding window can also be used, measuring the power of the signal on N (e.g., we can choose N to be 10) samples and then perform averaging of computed samples in order to detect the presence of the attack. If an attack is performed, a peak in this function will be shown at the level different from the nominal level, to indicate the attack. Data statistics about the measured power of the signal on L1 carrier is measured and marked in RINEX format by the ASHTECH Z-II receiver in the form of SNR (SNR=S−kTB).

TABLE I

Parameters for the propagation model

| Parameter | Value |
|---|---|
| Minimum received power | −160 dBW |
| User linear antenna gain | 3 dB |
| Atmospheric and polarization loss | 2.4 dB |
| Satellite antenna gain | 13.4 dB |
| Satellite power | (450,550) W |

Figure 4:
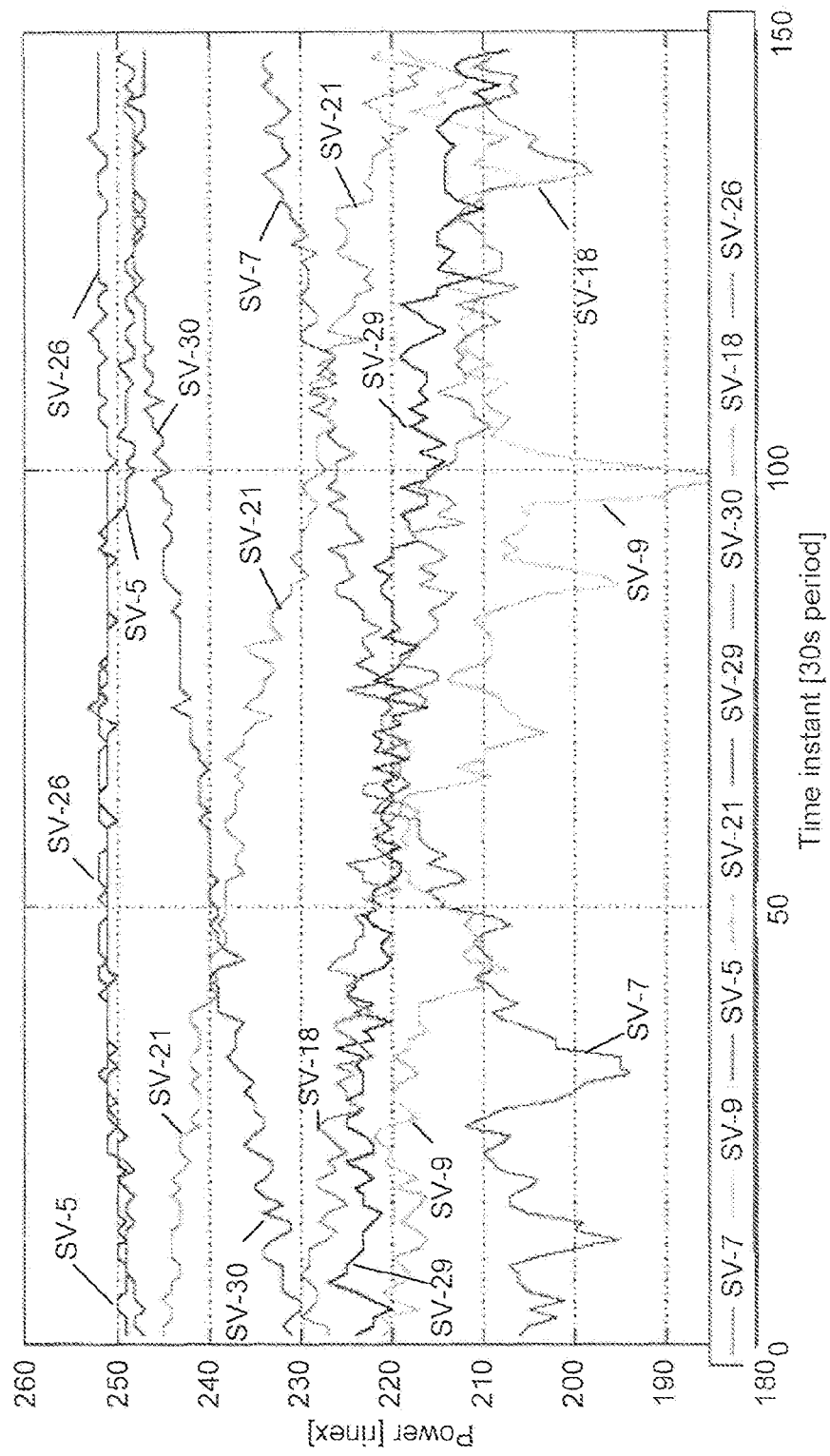
FIG. 4: Power statistics of the received signal

Update step was 30s, and the power of the satellites was analyzed for different satellites. It can be seen in FIG. 4 that the power variation is different for each satellite depending on the geometry and the current constellation position.

In order to evaluate the performance of the receiver in the presence of the attackers with the scheme and tests proposed herein, the GPS traces that were collected by the ASHTECH Z-XII3T that outputs the raw collected data into RINEX (Receiver Independent Exchange Format) were used. We collected both observation and navigation data (.obs and .nav), and integrate it in the simulation set-up, together with random mobility model.

Received signal power of the valid GNSS signals varies from the minimal nominal signal level for the C/A code on the Earth (−160 dB) at the level ±3 dB at most, depending on the satellite elevation angle and the geometry. In order for an attacker to mask valid signals and pass the power test, it has to vary signal power according to the distance from the area the vehicle traverses. This confirms that the attack could only individually be directed to specific zones and specific vehicles. If the attacker has the knowledge of the receiver's position or could track the vehicle in real-time, it could only then adjust the power such that the signal level at the place of the receiver matches the expected mean power of the signal and deceive it. This attack is identified as the most sophisticated. In the case of the static attacker, power bounds limits the area that an attacker could control, on the ring with radius R1<R<R2, where R1 and R2 are radius of the circles determined from the propagation model used in section I and for the minimal and maximal value for the power determined previously.

Figure 5:
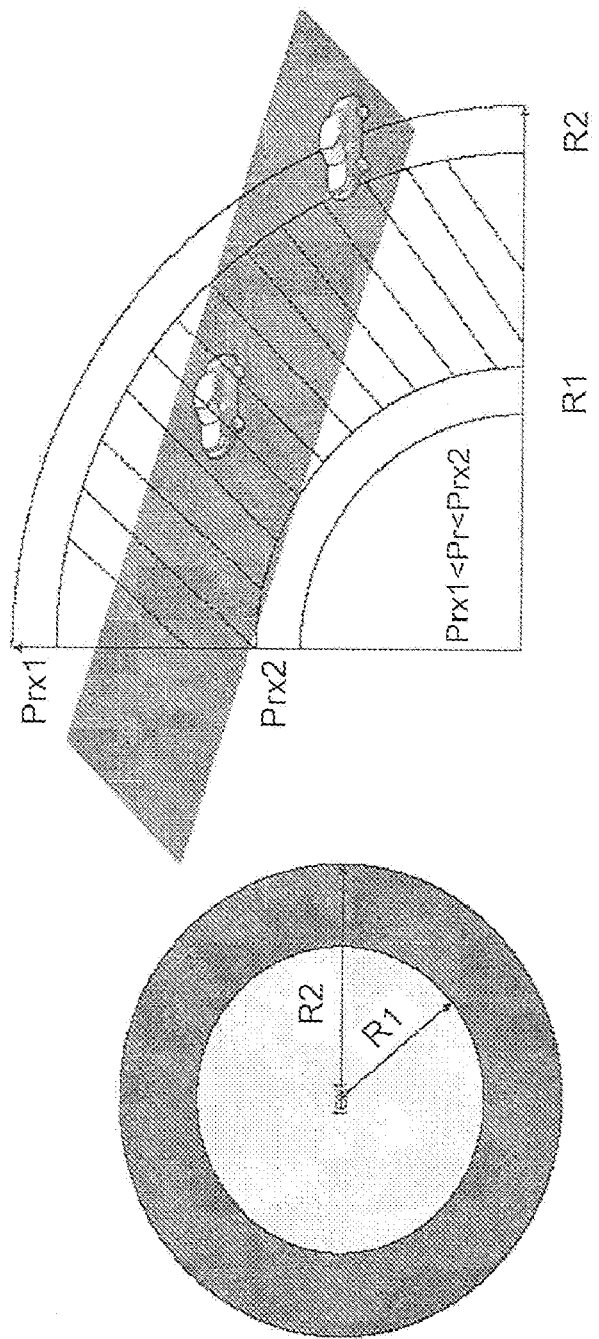
FIG. 5: Zone of possible attack

In this case, adversary is able to control only the zone limited by the arcs, and collection of points between the maximal and minimal power level, as it is shown on the FIG. 5. For the qualitative expression of the success of the attack we assume it is proportional to the surface of the area. Therefore, without the other tests, using only the power test, the attacker could be successful in the following fraction of all cases:

$$r = \frac{S_1 - S_2}{S_1} = \frac{R_1^2 - R_2^2}{R_1^2} \quad (4)$$

This ratio depends on the power of the attacker, which can be adjustable, but in specific time instants, attacker can not do better than this. This ratio is the upper bound for the attacker success ratio, if it is defined as the ability of the attacker to control certain zone and make the receivers lock onto spoofed signal. One could therefore say that the improvement over the case without power test when the attacker could control whole zone with the radius R1 and in the second case when the zone that is controlled is limited to the ring between R1 and R2, can be computed as:

$$i = \frac{R_2^2}{R_1^2} \quad (5)$$

As a quantitative measure, the surface of a circle defined as S=R²π is used. Results of an analysis for the power level variation (0.001, 1) W of the attacker are shown on FIG. 5. As could be noticed from the FIG. 6, for the standard set of simulation parameters that were used here, signal power variation 3 dB, and for power adjustment starting from 10 mW, going up to 1 W, attacker success ratio doesn't have any known probability distribution. It varies randomly, as the radius of the areas controlled by the attacker increase depending on the transmitted power and the geometry. One could notice that the maximal success ratio is under the 40%, with the mean value of 35.94% and the standard variation of 0.00369. This means that with the power test, there is the improvement from the attacker controlling the whole zone, to the case when it is possible to control just a narrow zone, of 64%.

This limits the power of the attacker significantly by just considering the received power and keeping track of the average and relative power for each of the satellite. There is the chance for the attacker to succeed, but with this simple test the power of the attack is reduced for 70%.

This automatically means that the attacker success ratio is even smaller in the case when one considers the node moving through the area, since there is a time for the receiver to unlock from the satellite (jamming), and then lock to the attacker signal. This process can last for more than half a minute, and since the size of the area depends on the transmitted power (as we could see from the FIG. 5). Therefore, this analysis provides the upper bound for the success of the attack if just power test is performed.

Also analyzed was the case when the random component that models shadowing and signal variation varied in the different ranges. Observation and tests that were performed showed that success ratio did not change for more than 5% in the worst case of variation from 0.5 to 5 dB.

The granularity of the ratio depends on the power limits that have been defined as the maximal and minimal value. GNNS signal is at very low level, and variations are not higher than 3 dB absolute value. If we assume great variations and unpredictability of the signal as the worst case, our results showed that the attacker can have success in at most 50% of the cases, and that the minimum improvement of the attack detection is also 50%. If the receiver has a good ability to predict the losses and accurately model shadowing and multipath error, power measurements would be more accurate, and spoofed signals easily detected.

Time Test

Each receiver has a clock which is often updated based on the GNSS functionality that allows the receiver to calculate a time correction. Essentially, the clock value of the receiver can be kept independently of the GNSS enabled corrections, as the clock oscillator can drift but only slowly, the amount of the drift depending on the technology of the clock. Based on some prior synchronization, the clock ticking independently of the GNSS functionality is the V value for the receiver: As long as the GNSS time correction, the M value for the receiver, does not exceed $T_1$, the maximum clock drift, then the method does not detect an adversarial intervention. Otherwise it does. Alternatively, the receiver can obtain its clock value from an external source, thus performing the comparison of this external value B with M; now, $T_2$ will be the accuracy of the synchronization from such an external source. Or, a combination is possible: such B can be provided from external sources (see discussion below in this document) and it can be later corrected by GNSS functionality, followed by checking it the time correction provides a clock value within the range of those acceptable based on the clock drift.

Each receiver has a clock that is in general imprecise, due to the drift errors of the quartz crystal. If the reception of GNSS signals is disrupted, the oscillator switches from normal to holdover mode. Then, the time accuracy depends only on the stability of the local oscillator. The quartz crystals of different clocks run at slightly different frequencies, causing the clock values to gradually diverge from each other (skew error).

There is a wide range of clocks to consider, with differing characteristics. Based on the literature on quartz clocks claims, coarse time synchronization can be maintained at microsecond accuracy (without GNSS reception and thus synchronization) for 350 sec in 95% cases. This means that quartz oscillators can maintain millisecond synchronization for few hours, including random errors and temperature change inaccuracies. Indeed, in such a case, if a receiver had a clock with such stability, the adversary would need to cause GNSS availability for long periods of time, for example, tens of hours, before being able to mount a relay attack that causes a time offset in the order of tens of milliseconds. This would entail that either such a jammer would be easy to detect and localize or the attack would be very hard to mount as the victim receiver would move away from the zone of influence of the attacker, or the user of the device integrating the receiver would easily notice the long unavailability period.

Location Test

The very basis of GNSS based positioning is the calculation of positions. The Location Test (LT) utilizes those positions and checks if the change in the mobility of the receiver is beyond acceptable limits. There are different variants of the location test, which essentially are Motion Tests (MT). At its first version, the LT or essentially the MT, allows the receiver to calculate, based on based on prior location(s), the limits of the next acceptable displacement and location and compare M and V, with M the new location the GNSS provides. The threshold $T_1$ can be available for example based on the physics of the GNSS receiver bearer (boat, truck, private vehicle, buoy, or any other vessel or aircraft or mobile or static object). Similarly, based on location, velocity, acceleration, or other motion descriptors, their absolute values or their vectors can be calculated as V and compared against the M, the corresponding motion descriptor value as resulting from the latest GNSS provided position (and time correction if necessary). More generally, a prediction of future location or other motion descriptors can be performed to obtain a more accurate V value and also determine tighter thresholds for the acceptable deviation (in other words error) within which the measured M can acceptably fall. In any case, if those motion descriptors, match the acceptable ones, no adversarial detection takes. Otherwise, the receiver rejects the involved GNSS signal(s) and message(s).

An alternative form of the location (LT) or motion (MT) tests can rely on data of type B. Those can be obtained by sensors that the bearer of the GNSS receiver has, such as, for example, altimeters, speedometers, and odometers, which can calculate the receiver location thus other motion descriptors independently of the GNSS functionality. Then, the receiver can utilize those B values and compare them the measured from GNSS functionality position(s) and resultant motion descriptors. The threshold $T_2$ in those cases is the accuracy of each of the sensors, including aforementioned ones. A variant of this LT and MT can combine the external measurements B along with GNSS related data with some statistical processing of those to perform better prediction, essentially producing a sort of V values. In any case, if the measured and sensor provided values, within the expanded range of values by the threshold, match, then there is no adversarial detection.

Figure 8A:
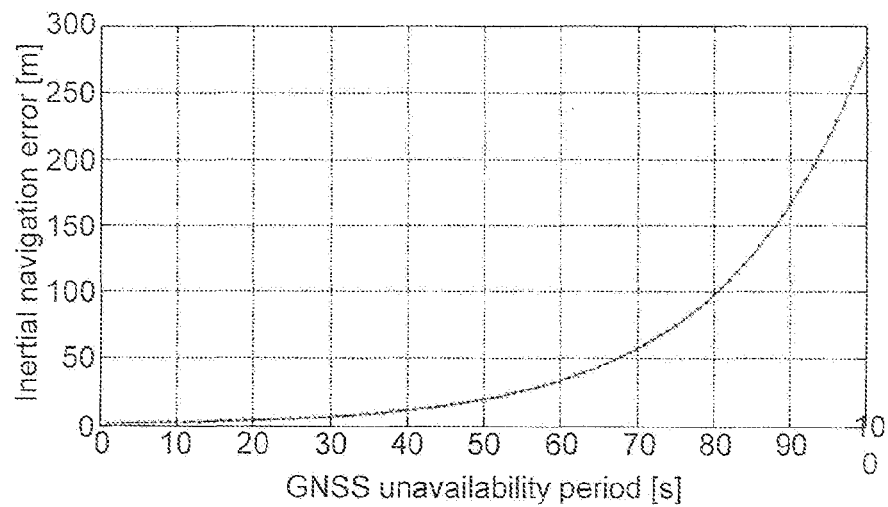
FIG. 8: Location test, based on (a) Low-cost inertial sensor, (b) Improvement when additional processing is used (on top of the same low-cost inertial sensor).

At the transition to alert mode, the node utilizes own location information obtained from the PVT solution, to predict positions while in attack mode. If those positions match the suspected as fraudulent PVT ones, the receiver returns to normal mode. Considered here are two examples for the location prediction approach: (i) inertial sensors and (ii) Kalman filtering. Inertial sensors, i.e., altimeters, speedometers, odometers, can calculate the node (receiver) location independently of the GNSS functionality. However, the accuracy of such (electromechanical) sensors degrades with time. One example is the low-cost inertial MEMS Crista IMU-15 sensor (Inertial Measurement Unit). FIG. 8A shows the position error as a function of time which is in our context corresponds to the period the receiver is in the alert mode. As the inertial sensor inaccuracy increases, but clearly, a more sophisticated sensor with improved performance (thus, lower error) can be used.

Figure 8B:
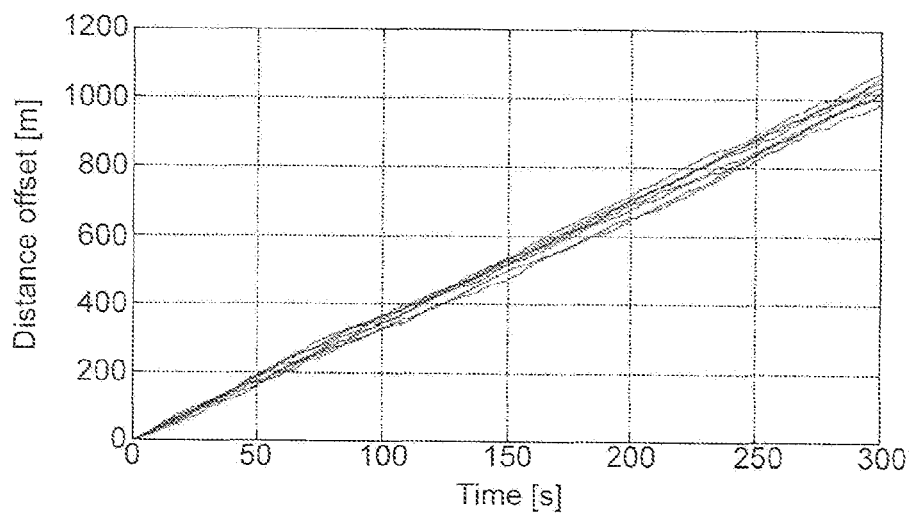

A more effective approach is to rely on Kalman filtering of location information obtained during normal mode. Predicted locations can be obtained by the following system model:

$$S_{k+1} = \Phi_k S_k + W_k \quad (6)$$

with $S_k$ being the system state, i.e., location $(X_k, Y_k, Z_k)$ and velocity $(V_{xk}, V_{yk}, V_{zk})$ vectors, $\Phi_k$ the transition matrix, and $W_k$ the noise. FIG. 8B illustrates the location offset for a set of various trajectories. Unlike the case that only inertial sensors are used, with measurements of inertial sensors (with the error characteristics of FIG. 3 used as data when GNSS signals are unavailable, filtering provides a linearly increasing error with the period of GNSS unavailability.

Propagation Delay Test

Due to the positions and trajectories of the GNSS satellites, at large distances from the earth surface, the GNSS signal propagation delay from the satellite to essentially any receiver is in the range of approximately 60 to 80 milliseconds. The signal propagation delay is calculated by the receiver upon each reception, and the measured value M is compared directly with B, the 60 and 80 milliseconds. If M is within this range or at most at some $T_2$ outside this range (e.g., some $T_2$ of few milliseconds, to consider all potentially extreme relative placements of the GNSS satellite and receiver and propagation conditions), the Propagation Delay Test (PDT) yields a negative (no attack) result. Otherwise, it detects an attack (adversarial signal reception).

External Network Assisted Tests

An external network, cellular, WLAN, WiMax, or any other non-GNSS and GNSS independent network is available, provide values for any M or any D or any by-product of theirs that can be used for the detection. Examples are: coarse grained location, time, almanac, or other GNSS related data, etc. Any of those systems could provide information that is independent from the GNSS functionality, thus making the task of the adversary harder: it essentially raises the bar for the adversary that would then need to be able to attack such external systems as well. For example, the external system can provide synchronization and based on that the GNSS receiver can run a Time Test (TT), for example, independently or in parallel or in combined with the above-mentioned TT test. Or it can localize itself based on the surrounding infrastructure (for example, cellular telephony and data system, with the localization of the device performed jointly by multiple base stations of the system, over a communication environment that is completely disjoint to that of the GNSS) and run a variant of the Location Test (LT). Or obtain any GNSS-related information (e.g., expected Doppler Shift values over some period of time and the approximate current location of the receiver based on which the receiver can run the DST utilizing those data as B and its current measurements as M). The external network can either be open to queries from the GNSS receiver for any data or publicize/broadcast such assistive data. The condition for enabling any such external test is that the GNSS receiver is enhanced with the hardware and software to interface and communicate with those external, non-GNSS networks, or simply be integrated in another platform that has those interfaces.

In addition, for the case of having special assistive infrastructure present ('Pseudo-lites', or any other equipment that provides GNSS-like signals or repeats at high power GNSS-like signals), all the tests (methods) described here can be adapted. The necessary addition in the system functionality is to provide the receiver a priori (or enable it to obtain it on-demand) information on the presence and the operational configuration of such infrastructure. Then, based on such information acquired during the normal mode of operation, the receiver can performed all the tests by taking those parameters into account. For example, knowing it approaches or it already entered an area where such assistive signals will be received (or they are indeed confirmed to be received by a trustworthy source), the receiver would not reject signals received and bearing the characteristics (e.g., power or Doppler shift) due to their transmission from the assistive infrastructure unit. Such additional signals, along with any additional information they may carry (compared to traditional GNSS signals), can be combined along with GNSS signals in the MCSS test described below too.

Examination of Multiple Combinations of Satellites and Solutions Tests

Overall, the GNSS receivers obtain signals and messages or lock on multiple satellites. Even though at least four satellites are necessary for obtaining a position and time correction, more satellites are in general visible, but with varying received signal quality due to the physical limitations of the signal propagation (for example, landscape obstacles, relative position of the satellite and the receiver, etc). At the same time, the adversary can try to forge and spoof exactly those signals that are weaker, or independently of that provide any set of illegitimate GNSS signals and messages as if they originate from any of the expected to be visible satellites (this can be checked by the receiver based on system available information).

The Multiple Combinations of Satellites and Solutions (MCSS) Tests can utilize any combination of the above described tests or any combination as a basic component of the MCSS test. But it performs that basic component test (or multi-test) for each of the available visible satellites combinations, for example, any combination of four or more satellites out of for example seven that happen to be currently visible and received. For each of those combinations, a detection of adversarial intervention is performed, either per signal or per the overall outcome of the GNSS functionality of the receiver. If for example the adversary is injecting illegitimate signals purporting to originate from three satellites, then all combinations that involve at least one adversarial signal (impersonated satellite) can be detected. This can provide increased confidence on which signals are the illegitimate ones and allow the operation of the GNSS receiver based only on legitimate signals. In other words, the MCSS can provide finer-grained detection.

Collaborative Distributed Detection of Attacks

We propose a distributed protocol for Collaborative Detection of Attacks, which we term as the CDDA test, basically relies on the presence of multiple receivers with the capabilities (or part of) described above. All the above tests can be and they are designed to be performed individually by each receiver. The intuition behind the CDDA test is that when there are more than one receivers capable of running any of the above tests, then they can collaborate to significantly enhance the strength of their detection or even perform detections of attacks that are uniquely possible exactly thanks to the distributed collaborative operation.

Consider a neighborhood of the system, that is, a geographical region where a set of K receivers with the above described capabilities are present, we denote those as $SR_i$, with $i=1, \ldots, K$ an index. The $SR_i$ have the additional capability to communicate to each other over one or more communication channels, possibly unrelated to the GNSS functionality. This can be easily achieved with a broad range of wireless communication and/or mobile networking technologies that are currently available. The basic functionality of CDDA comprises the following steps:

Let some $SR_j$, j=1, . . . K, performing one or more or any combination of the above mentioned tests.

If any of the performed tests are inconclusive or if any of the tests indicates an attack while others do not, or if none of the tests indicate an attack, or simply if $SR_j$ wishes to simply corroborate its findings in any case, even if they appeared conclusive or clear, it initiates a distributed communication protocol.

$SR_j$ transmits a message across the chosen communication channel, requesting from any $SR_i$, i≠j (i.e., any SR other than $SR_j$ itself), to provide data on the detection of the attack.

Requested data can be simple, i.e., detection of attack or not

Requested data can be the result of any specific test or set of test, i.e., whether that specific (set of) test(s) indicates an attack or not Requested data can be raw measurements or other parameter values the $SR_i$ has and are related to the tests performed by $SR_j$.

$SR_j$ collects the requested data and it performs one or more of the following steps:

It determines the majority of the responses on the presence of an attack

It weights responses according to their conclusiveness (as judged by own decision or provided by collaborating nodes), and determines a weighted outcome on the presence of an attack It integrates raw measurements or parameters into its own memory and performs anew any of the tests.

At the conclusion of the protocol, $SR_j$ increases or decreases its assurance of the presence of an attack.

As an example to illustrate why the CDDA test can enhance the security of our system: consider the case of a sophisticated attacker that targets a single victim receiver (e.g., by trying to adjust its actions to accordingly match received power, Doppler shift etc at the victim). Now, in a favorable for the attacker example, assume that the victim receiver, VR, performs any of the stand-alone tests, detects a discrepancy in Doppler shift, accepts that received power, propagation delay are within acceptable limits. But its time test also agrees with the DST, indicating a discrepancy. By invoking the CDDA test, and requesting additional data on power and Doppler shift, the victim, VR, will easily be assured of the attack: As the effort to achieve small discrepancies forces the adversary to adjust its action with respect to that victim, any other receiver will receive significantly differing power and even more different Doppler shift due to the spoofing transmission. The other nodes would single-handedly declare attack in the same period and same region as the ones over which the CDDA test runs. Upon receipt of the relevant data, the victim, VR, will also be assured of the presence of an attack. The CDDA test can be perform in real-time but also after the onset of the attack, requesting past data from the memories of other receivers and operating also on the history of data of the receiver that initiates the CDDA test.

Additional Method Performance (Security) Evaluation Results

This section contains additional simulation results for a set of scenarios and different adversary types. First, we describe further the evaluation approach, including actions of the adversaries, and then provide the results.

Satellite Constellation: Satellites are moving to known trajectories with velocity that changes according to the ellipse movement around the earth. We are assuming that the satellite velocity is constant in one second time period. We are simulating the movement of the vehicle in different periods of time, using the data from GPS receiver about the available satellites in order to study the effect of attacks on GPS receiver. In each time instant (one second), we compute the velocity of each visible satellite, velocity of the vehicle that is randomly chosen, and then according to relative velocity vector between the vehicle and satellite compute the Doppler shift.

Signal Characteristics: Broadcast power, shadowing propagation model and antenna specifications from the "NAVSTAR GPS Joint Program Office *NAVSTAR Global Positioning System—Interface Specification IS-GPS* 200 *Space Segment/Navigation User Interfaces*. SMC/GP, CA, USA, 2004." The same radio model is assumed for the receiver under attack and the attacker as well. It is assumed that the attacker controls an area of radius R, position randomly generated in an area 10×10×10 km with different number of attackers (up to three) in the area and variable number of radios that are in the possession of the attacker. Simulation time was limited to 300s. When simulating the attacker activity, first we assumed that jamming is performed for some time before spoofing, in order for the receiver to unlock from the satellite, as it is shown on FIG. 6.

Vehicle Mobility: We showed the effects of the attacks on navigation receiver by simulating random network of vehicles, moving at different velocity randomly chosen in different ranges [Vmin, Vmax]. Velocity was varied from 30 km/h to 300 km/h. Assuming the vehicles are in the same area, relative velocity between the satellites and the vehicles is computed, depending on the direction of vehicle's movement each second. Doppler shift is computed from the approximate model that is described in Doppler shift section according to the velocity of the satellite, and results compared.

There were two cases for different velocity dynamics investigated: the first one based on randomly chosen velocity in each moment independently from the previous moment, and the second case corresponds to the case where the velocity is chosen just in the first moment randomly in some range, and then varied adding or subtracting smaller ranges (we used (−5, 5)km/h and (−10, 10)km/h), so that the velocity dynamics corresponds to more realistic case.

Figure 6:
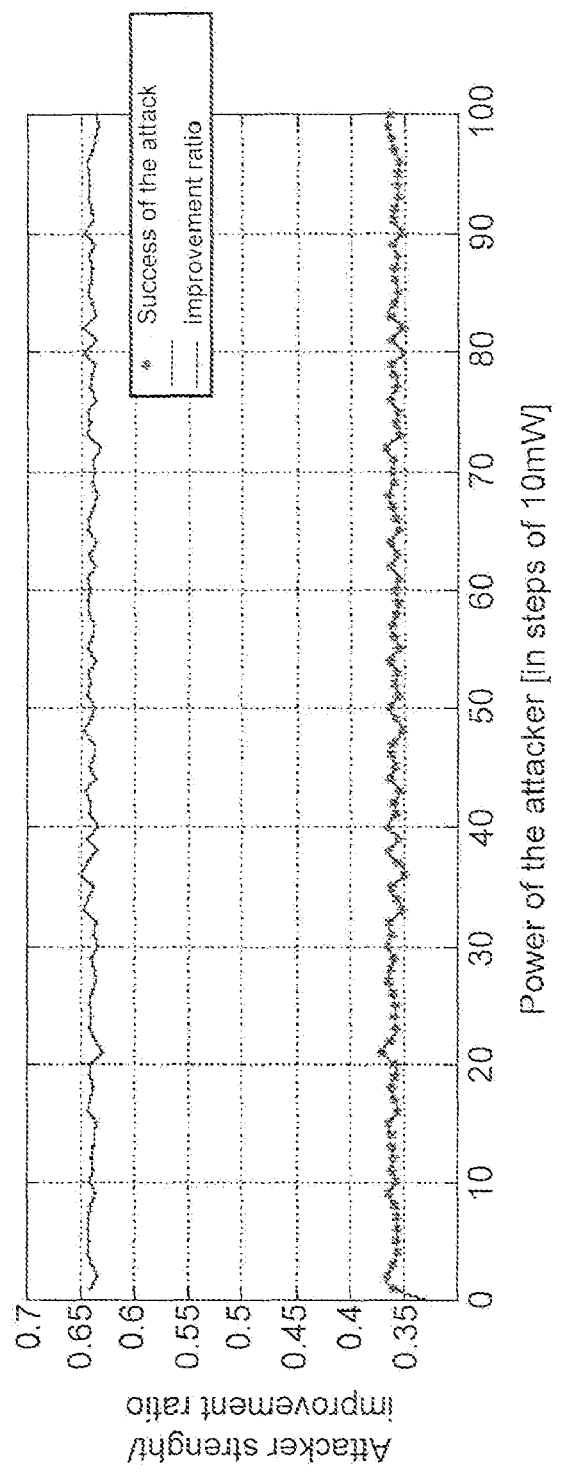
FIG. 6: Attacker success ratio and improvement ratio
Figure 7:
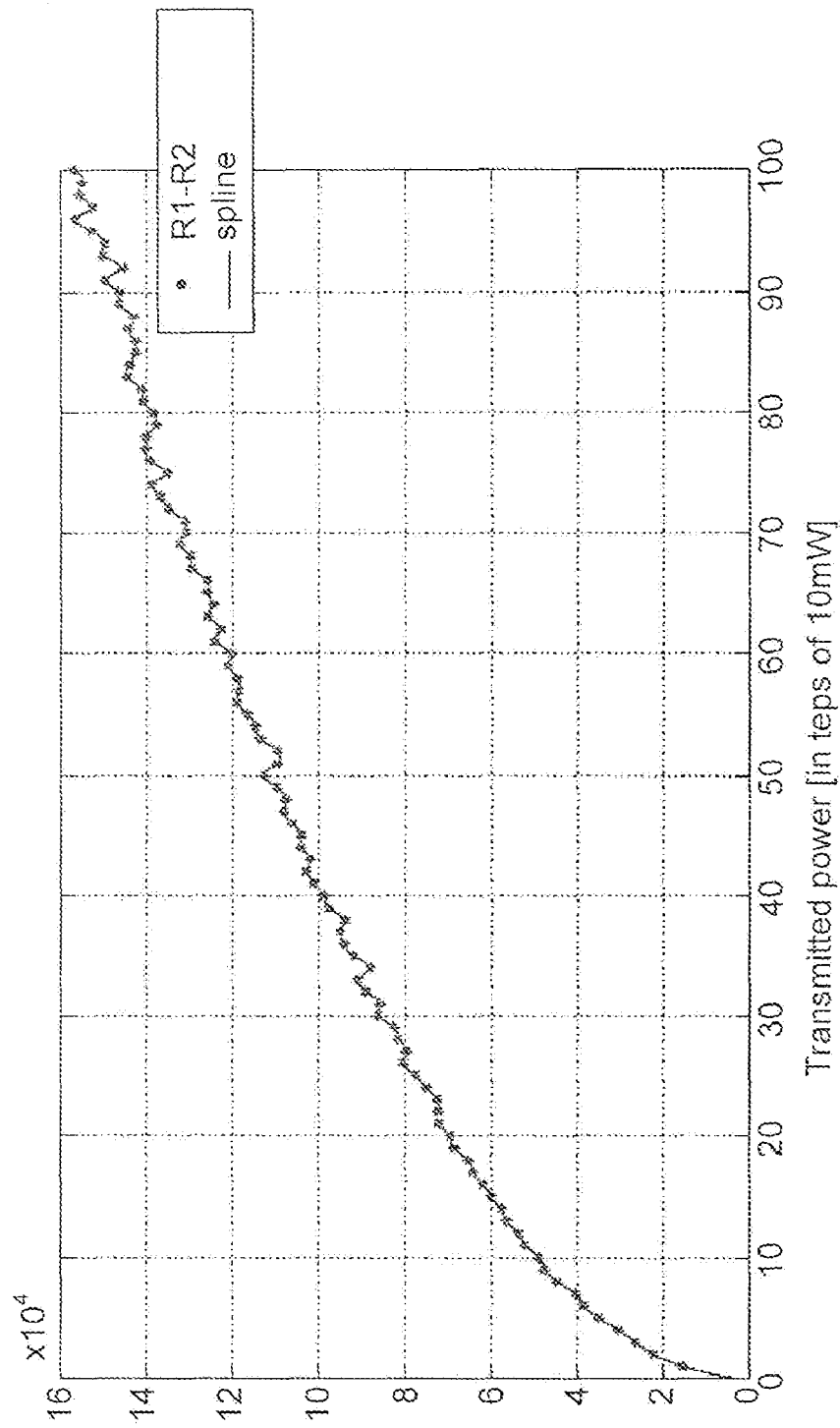
FIG. 7: Width of the zone between R1 and R2 that is under the control of the attacker

Reduction of impact thanks to the power test: Essentially for adaptive or fixed transmission adversaries, the power test reduces the affected area to that corresponding to the approximate ring defined by the two radii corresponding to the path loss that determines the received power. This is illustrated in FIG. 6.

We emphasize that this reduction is relevant on a per-radio basis. Clearly, if the attacker had multiple radios, each covering one of those zones, then, if it knows the position of the receiver it can do transmit signals with certain power, such that it corresponds to the power level at the exact location for each satellite.

The lower the transmission power, the closer the two distances, plus minus the uncertainty and the noise that we modeled by Gaussian distribution with variance 3 dB.

We do not consider the distribution of devices on a subset of the covered area: if this was the case, then reduction of the impact would depend on the geometry of the spatial distribution. We do not perform this exercise, in order to maintain the generality of our investigation.

Clearly, the area covered by adversarial transmissions overwriting the legitimate GNSS signals can be the first indication of the strength of the adversary. Without any defense mechanisms, all this area can be affected with attacks being successful essentially 100%, in terms of the mislead receivers. Our objective here is to show how attacks can be detected for different types of adversaries and how the impact of an attacker can be reduced thanks to the proposed counter-measures. We do not wish to make any assumption on the exact configuration of the adversary, in terms of the number of radios it controls, and the type of antennas. Clearly, the more of those, the more effective the adversary could be, in terms of the area of the network it can affect. If tests are considered individually, each of them decrease the success of the attack. We considered the following cases:

Constant Transmission and Frequency Adversary: The adversarial nodes control one or more radios and transmit synthesized or replayed messages. The attacker in this case can choose the transmitted power, and the transmission frequency. For any antenna pattern, that is, omni- or directional, this attack is easy to detect with the help of the power test: if the GNSS receiver is not at the distance from the attacker that results in received power within the expected limits. It is exactly the fixed power choice that limits the impact of such an attack.

It is possible to clearly distinguish between the adversary-controlled area and the signals received from the attacker by simply keeping track that the Doppler and the power is in the expected limited interval. More than 1000 Hz in the frequency offset and 50 dB in the power offset indicates the beginning of the attack.

Adaptive Transmission Power, Constant Transmission Frequency Adversary:

This type of adversary can be easily detected by the Doppler Shift Test, if the adversary could predict the power of the signal and accurately adjust the power in real-time so that it's matched at the place of the receiver. But we emphasize in this case the difference from the constant transmission power adversary in terms of "passing" the Power Test.

What is interesting is that the reduction of the impact (assuming there was no Doppler Shift test) is present even in the case of adaptive transmission power. A single radio can only transmit at one power level for a given period, which has to be long enough to allow GNSS receivers within the affected area to lock to the adversarial signals.

For the rest of the discussion, we continue considering adversaries that are more sophisticated in a sense that are able to change the frequency and power after down-conversion of the signal, such that the frequency shift and the power at the place of the receiver corresponds to the shift caused by satellites.

Adaptive Transmission Frequency and Power Adversary:

The attacker needs to jam the area first, in order to unlock the receiver from the satellite, and then replay or forge satellite signals or messages. Jamming detection is easy since jamming represents saturation of the receiver with a high-power signal and causes it to loose the lock of all satellites. This could be the first sign of the attack, and further tries to lock on to a signal with the tests we propose, can help in distinguishing between real and fake signals.

More sophisticated adversary is considered here, with the ability to change the frequency and the power of the modulated signal. The signal is down-converted, then modulated on the new frequency such that satisfies the frequency shift of the satellites, with the power that matches the signal power at the place of the receiver and transmitted to the user. It has to produce the same Doppler shift as the GPS receiver will expect, since this change is linear, and transmit this message to the receiver. In order to do this, an attacker should transmit the NAV message on the frequency that is different from the nominal frequency used by the satellites ft. Spoofer could compute Doppler frequency shift from the known equations, and then change the frequency ft such that it will produce the same shift at the place of the receiver, and then it should modulate navigation message with this frequency.

So this would be the most sophisticated attack, Doppler shift computed according to the formula:

$$f_{t1} \cdot \frac{\Delta V}{c} = df_t \qquad (XX)$$

$$df_t = f_t \cdot \frac{V_r}{c}$$

where $f_{t1}$ is the new frequency adjusted by the attacker, $f_t$ regular transmitting frequency, $\Delta V$ is the relative velocity between the attacker and the receiver and $V_r$ velocity shift between the attacker and the satellite. In second case not just the frequency shift is equalized. Whole measured frequency is equalized at the attacker and the receiver place.

Figure 10:
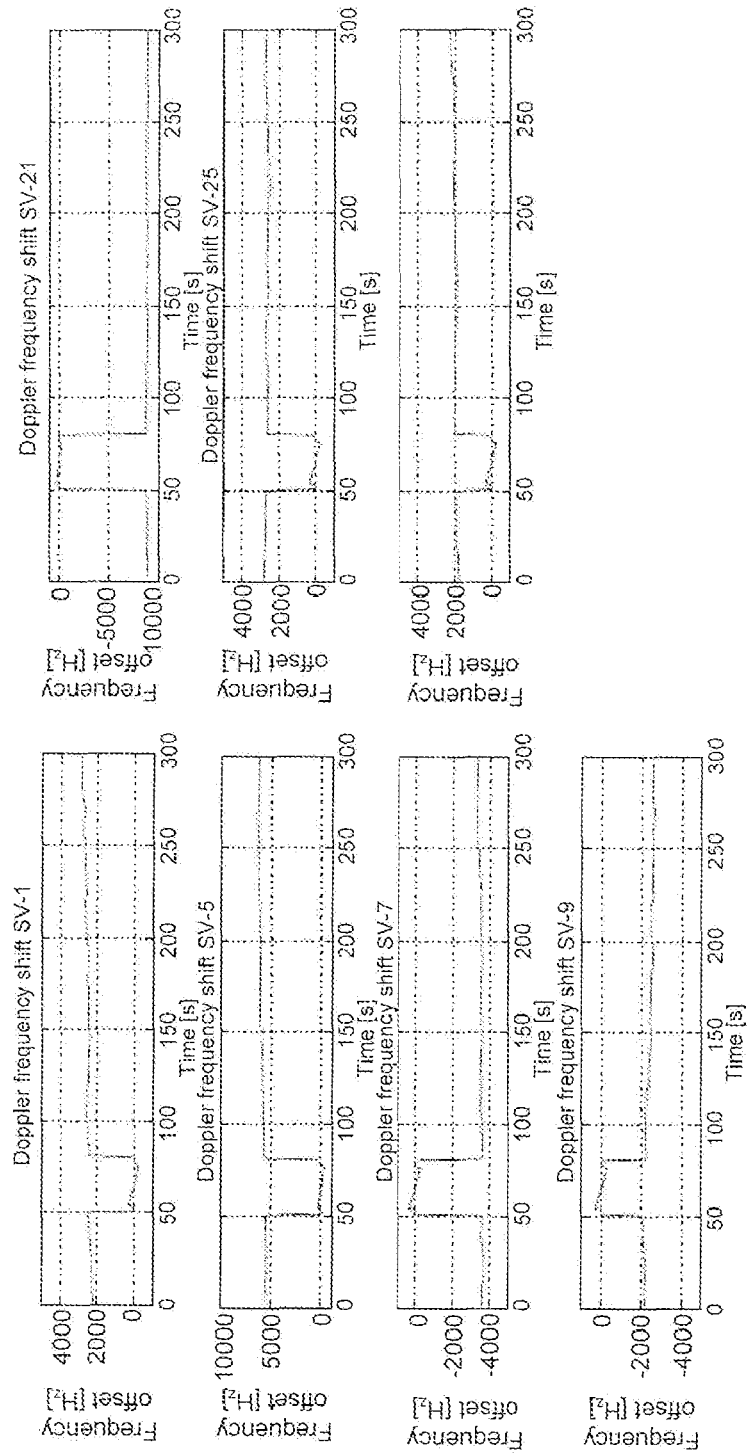
FIG. 10: Doppler frequency offset at the edge between attacker and attacker-free zone (unsophisticated attacker case)

Different trajectories of vehicle movement have been investigated in the observed area, shown in a birds view fashion at FIG. 9. We could observe that the main component for the frequency shift is due to the satellite movement, minor variations are caused by the movement of the vehicle, and these variations could be controlled knowing the velocity of the vehicle. Even in the frequency adjustment case, when the adversary adjust the frequency dynamically to match the expected shift there is mismatch of few hundred hertz as we can see from the FIG. 10, so this kind of attack is easily detected.

Next considered scenario is the case when the attacker adjusts the power of the broadcast signal in order to deceive the receiver and pass the power test. Since the attacker is located on the ground often close to the GNNS receiver, variations of the signal power are higher than the variations of the satellite signal and easily detectable. Attacker could control very narrow area where it is possible to adjust power to be in the range (Pmin, Pmax) so that receiver could accept the signals and pass the test.

Figure 11:
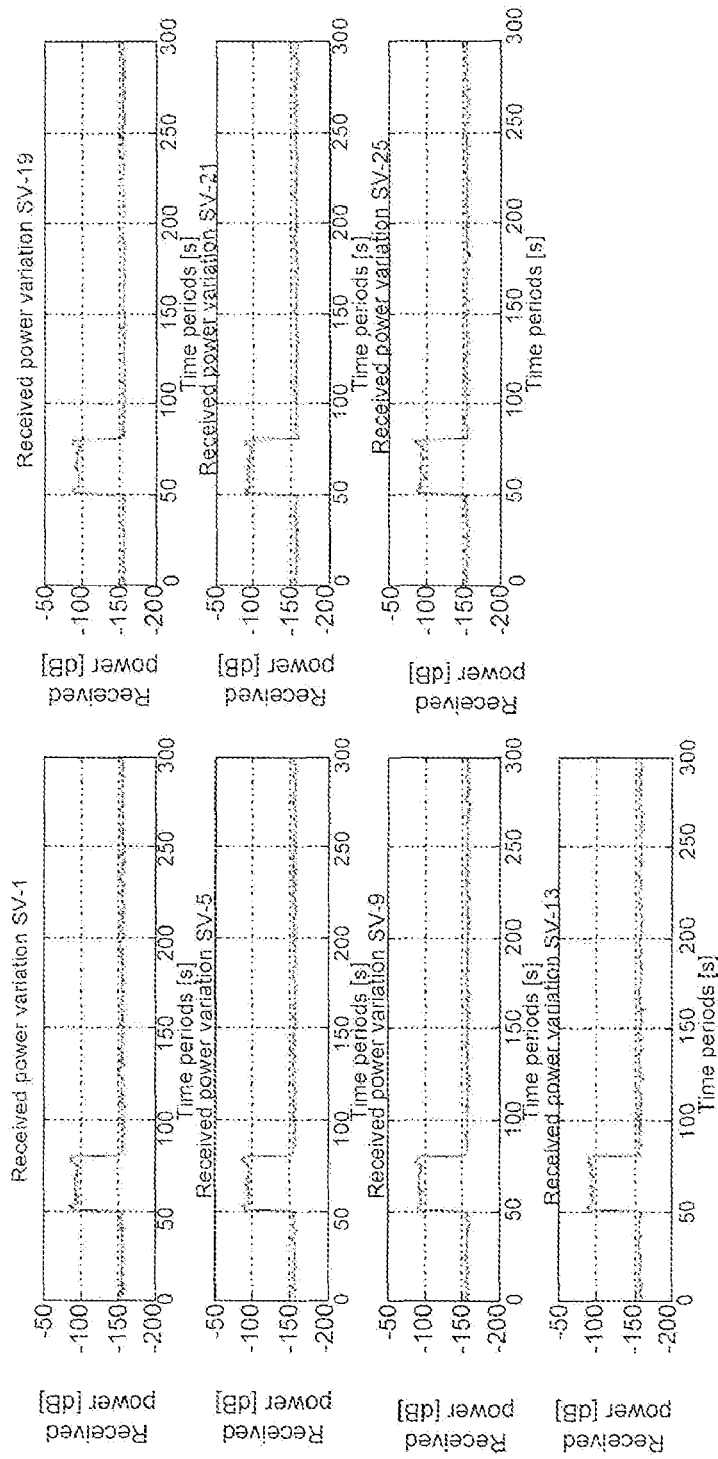
FIG. 11: Power level for satellite constellation at the edge between attacker and attacker-free zone (unsophisticated attacker case)
Figure 12:
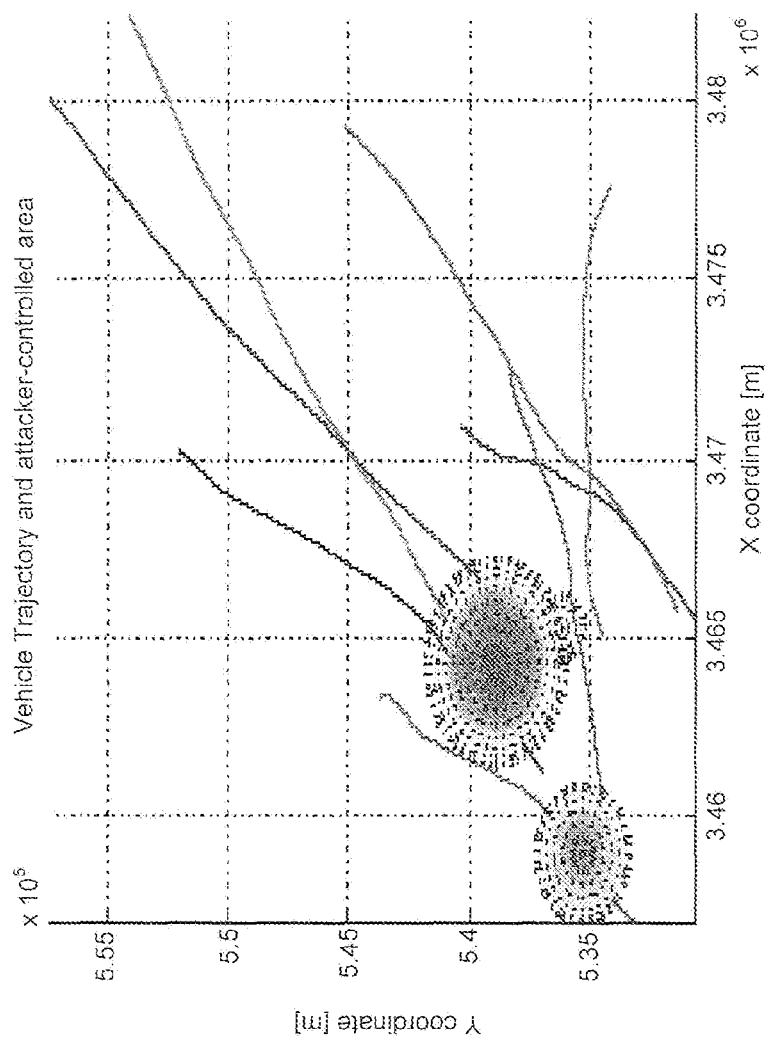
FIG. 12: 2-D area of the vehicle movement with the area that is under the control of tree attackers and different trajectories that were under invest FIG. 13 Doppler frequency shift in the frequency adjustment case
Figure 13:
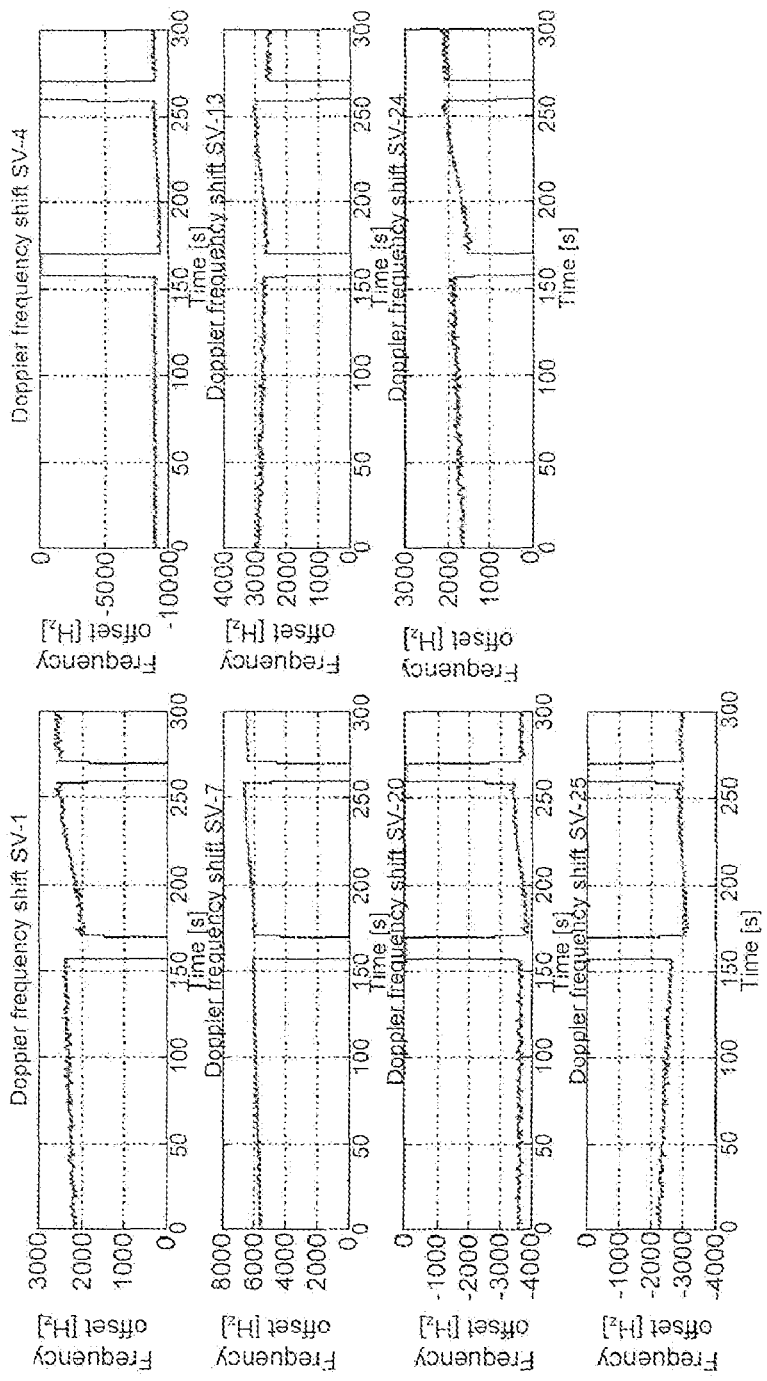
Figure 14:
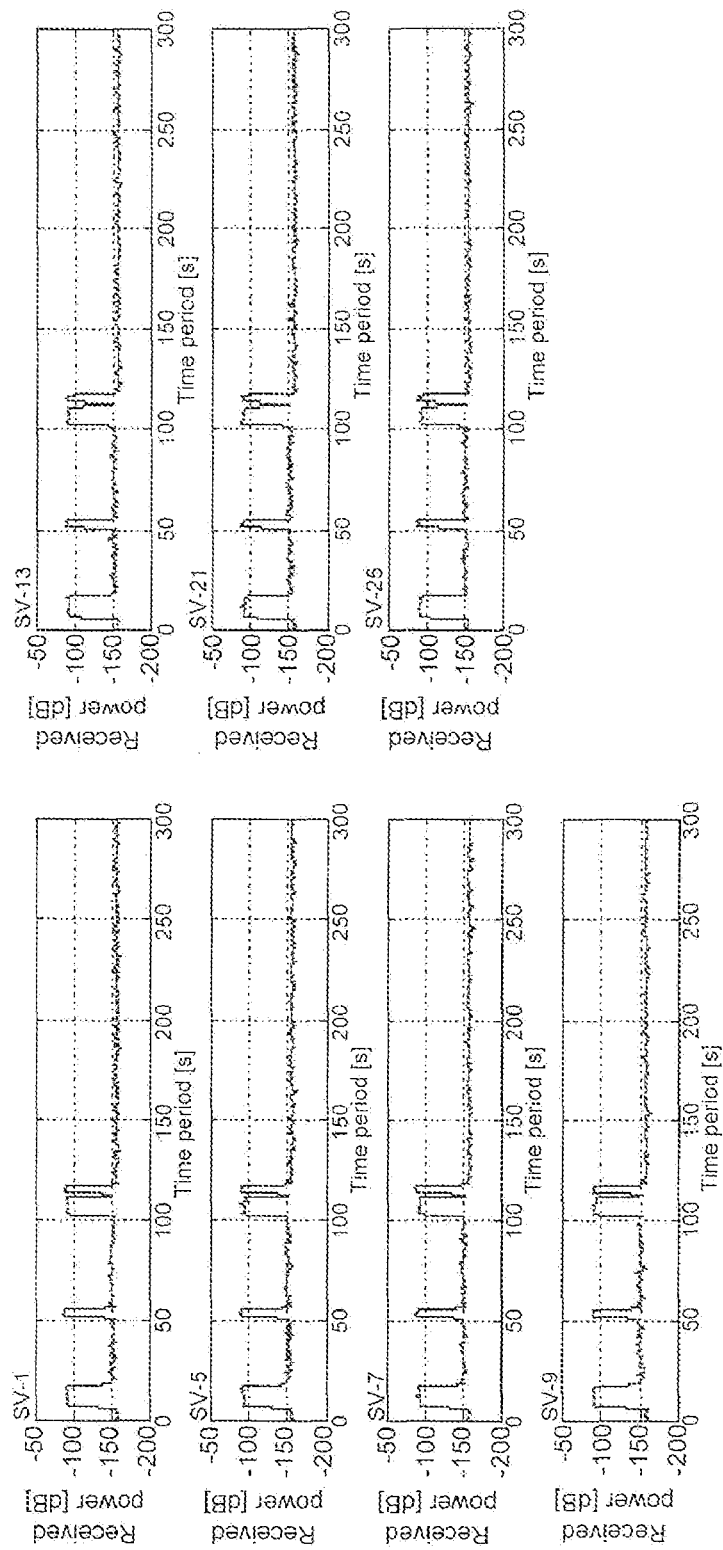
FIG. 14: Power level for satellite constellation at the edge between attacker and attacker-free zone (sophisticated attacker case)
Figure 15:
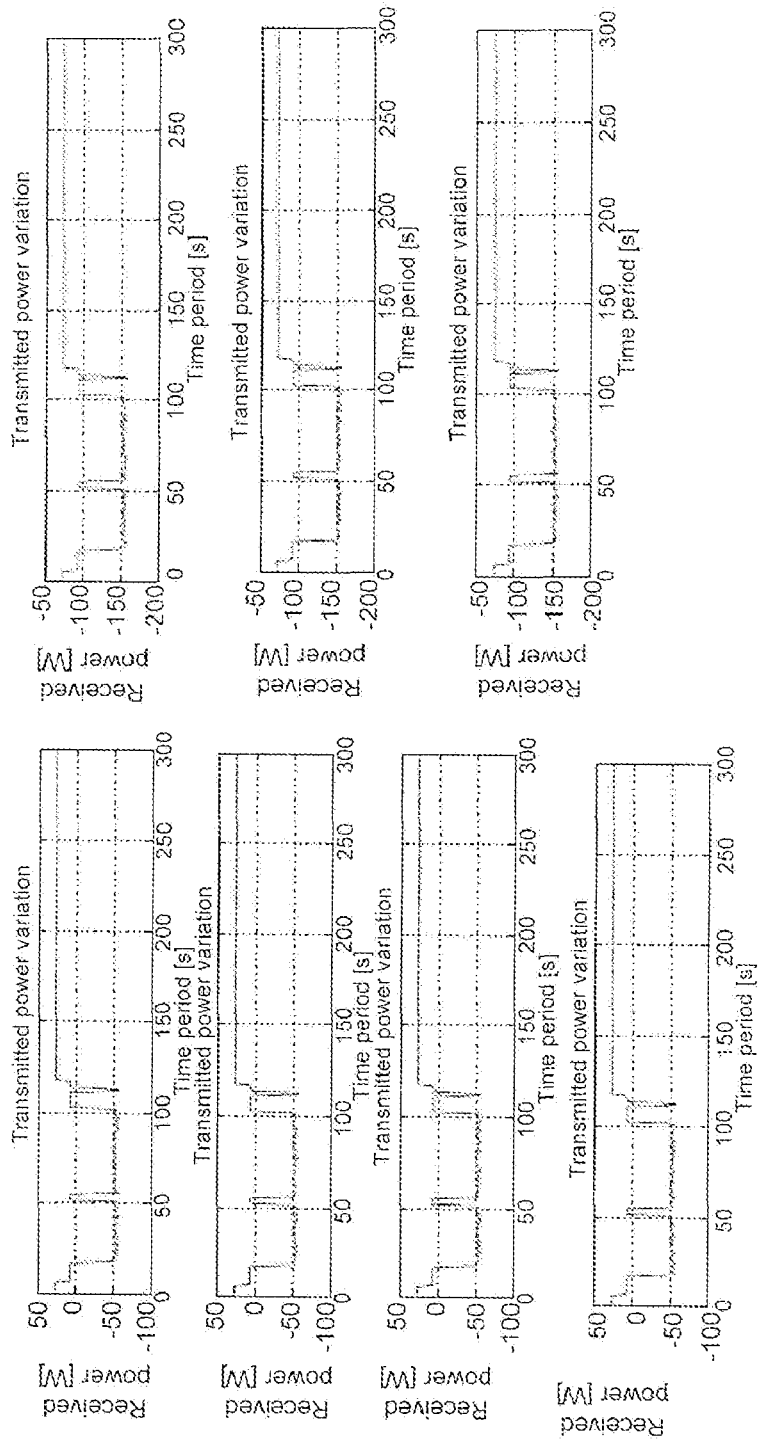
FIG. 15: Transmitted power level of adversary's radio in order to match the power of the signal at the receiver
Figure 16:
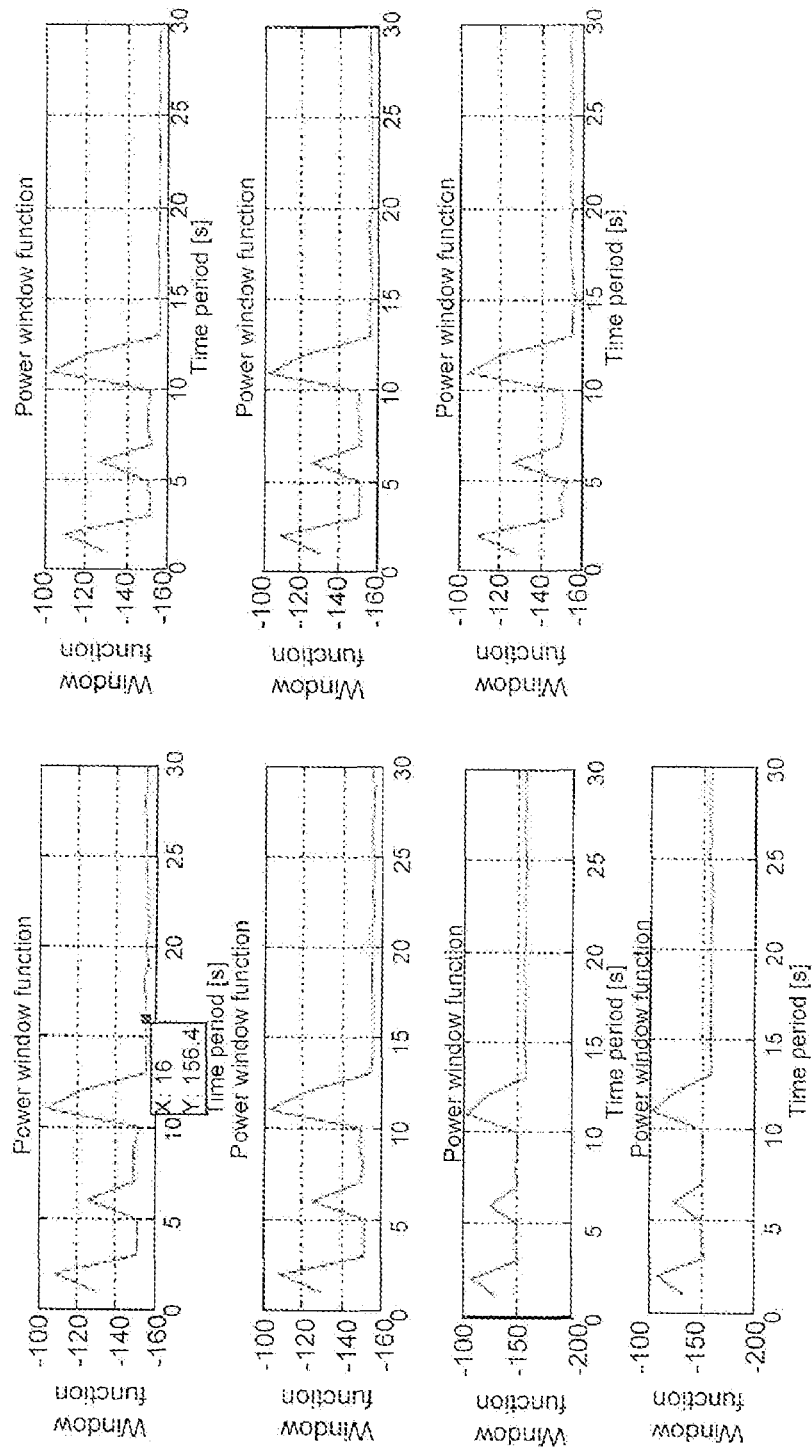
FIG. 16: Defined power function aiming to easily detect the attack taking into consideration 10 previous samples

Attacker tries to deceive the receiver by simultaneously adjusting the power of the signal such that it matches the received power at the receiver's location. This is the most dangerous type of attack and the most sophisticated considering the power test, since the attacker follows the victim and adjusts the power accordingly. There is again the same scenario as in the Doppler test case: the case when the assumption is that the attacker controls just one radio and adjust the power according to the average values for the free-space propagation and power, and the sophisticated case, when the attacker is in the possession of great number of radios with wide transmission power variation. In fact, the attacker should be able to adjust S/N (signal-to-noise ratio) that is measured by the receiver. Power test could be masked by the attacker by adjusting the power level in order to match the power of the GPS signal. What the attacker could do is to measure the power level of the signal and broadcast the signals with the adjusted power so that at the edge of the zone the receiver will accept the signals without noticing the real signal level. We observed from the simulations that the power level can not be adjusted ideally, as we can see from the FIG. 11. Jamming is always the indicator of the start of the attack—the received power level is different for more than 5 dB and the attack is easily detected. The sophisticated adversary should be able to predict the power of the signal and match it at the place of the receiver. Transmitting pattern should be therefore as shown on FIG. 12. In the power test case, we defined the sliding window that by measuring the power of the signal on N (we choose N to be 10) samples and then perform averaging of computed samples in order to detect the presence of the attack. If an attack is performed, a pick in this function will be shown at the level different from the nominal level. This could be an indicator of the attack. We also investigated this case as a better indicator of the attack, since the attack could be detected earlier and granularity of detection is better. This could be seen from the FIG. 13.

We could observe the difference in the attacker and attacker-free case in the Doppler shift from the following figure, as well as received power in the case of an attack and attacker-free case.

We could observe that the power levels are different, even in the case when the attacker tries to adjust the transmitted power. In this case, mobility helps security since the attacker doesn't know the position of the vehicle in order to adjust the power accordingly, since the power of the signal decays with square distance, and this decay is fast, and it is very hard to control it. We could see different levels of received power, and power window function that will tell us about the attacker present in the area.

What is claimed is:

1. A method to secure GNSS based locations in a device having a GNSS receiver receiving a plurality of satellite signals, processor and a memory, said method comprising the steps of:
   acquiring first positions by the GNSS receiver;
   extracting trusted position relevant values of said first positions and storing the trusted position relevant values in the memory;
   acquiring at least one second position by the GNSS receiver;
   extracting a second position relevant value of said second position;
   calculating an expected relevant value based on the trusted position relevant values;
   calculating a metric representing the difference between the second position relevant value and the expected relevant value; and
   setting an invalid flag when the metric is above a threshold.

2. The method of claim 1 wherein the position relevant value is a Doppler shift value representing the relative motion of a satellite with respect to the receiver, the metric being the difference between the Doppler shift values of the first positions and the Doppler shift value of the second position.

3. The method of claim 2, wherein the step of calculating the expected value is carried out by determining a variation of the Doppler shift value with at least the two last trusted position relevant values.

4. The method of claim 1, wherein the position relevant value is Doppler shift values of at least two satellites representing the relative motion of said satellite with respect to the receiver, the metric being the difference between the Doppler shift values of the first and second satellite of the first positions and the Doppler shift value of the second position of the first and second satellite.

5. The method of claim 1, wherein said method comprises a further step of measuring a signal power level representing the signal power of the satellite signal and comparing the signal power with at least one maximum value.

6. The method of claim 1, wherein the position relevant value is a power signal of the received satellite signal, the metric being the difference between the power signal of the first positions and the power signal of the second position.

7. The method of claim 6, wherein the position relevant value is the ratio between two power signal of at least two satellite signal, the metric being the difference between the power signal ration of the first positions and the ratio power signal of the second position.

8. The method of claim 1, wherein the position relevant value is the location value, the trusted location values allowing to determine an expected area as expected value, the metric being the distance between the second location value and the limit of the second area.

9. The method of claim 8, wherein the expected area is further determined using actual movement detectors of the receiver.

10. The method of claim 8, wherein said method comprises a step of determining the velocity of the receiver using the trusted location values, the expected area is determined based on the velocity of the receiver.

11. The method of claim 8, wherein said method comprises a step of determining the velocity of the receiver using a velocity meter of the receiver, the expected area is determined based on the velocity of the receiver.

12. The method of claim 1, wherein the position relevant value is the time value bound with the satellite signal, the metric being the difference between the time value of the first positions and the time value of the second position.

13. The method of claim 1, wherein the receiver comprises a clock updated with the time of the first position and allowing to calculate elapsed time, the metric being the difference between the elapsed time and the time of the second position.

14. The method of claim 1, wherein a plurality of GNSS receivers have the capacity to communicate with each other, further comprising the steps of
   transmitting the second position relevant values from a first receiver for which the invalid flag has been set to a second receiver; and
   using additionally the received second position relevant values while calculating the metric.

15. A device comprising:
   a GNSS receiver for receiving a plurality of satellite signals;
   a processor connected to the GNSS receiver; and
   a memory connected to the processor;
   wherein the processor is configured to perform the steps of
      acquiring first positions by the GNSS receiver;
      extracting trusted position relevant values of said first positions and storing the trusted position relevant values in the memory;
      acquiring at least one second position by the GNSS receiver;
      extracting a second position relevant value of said second position;
      calculating an expected relevant value based on the trusted position relevant values;
      calculating a metric representing the difference between the second position relevant value and the expected relevant value; and
      setting an invalid flag when the metric is above a threshold.

* * * * *